United States Patent [19]

Miura

[11] Patent Number: 4,887,167
[45] Date of Patent: Dec. 12, 1989

[54] RECORDING APPARATUS

[75] Inventor: Kunihiko Miura, Hiratsuka, Japan

[73] Assignee: Kabushiki Kaisha Toshiba, Kanagawa, Japan

[21] Appl. No.: 5,411

[22] Filed: Jan. 20, 1987

[30] Foreign Application Priority Data

Jan. 22, 1986 [JP] Japan .................................. 61-9839

[51] Int. Cl.$^4$ ........................................... G01D 15/10
[52] U.S. Cl. .............................. 358/296; 346/76 PH; 346/140 R
[58] Field of Search ................ 346/76 PH, 75, 140 R, 346/153.1; 400/196, 202.2, 202.1, 202, 201; 355/14 SH, 3 SH; 358/296

[56] References Cited

U.S. PATENT DOCUMENTS

| 4,506,272 | 3/1985 | Arai | 346/76 PH |
| 4,562,444 | 12/1985 | Nagashima et al. | 346/76 PH |
| 4,630,075 | 12/1986 | Hori | 346/140 PD |
| 4,642,658 | 2/1987 | Arakawa | 346/76 PH |
| 4,724,447 | 2/1988 | Oda | 346/76 PH |

*Primary Examiner*—Clifford C. Shaw

*Attorney, Agent, or Firm*—Finnegan, Henderson, Farabow, Garrett and Dunner

[57] ABSTRACT

A recording apparatus according to the present invention is constructed to record data on a member to be recorded by filling recording ink in a film having a large number of minute orifices and by spouting ink from the minute orifices by means of the pressure of bubbles generated through the heating of filled ink with heating elements. The present recording apparatus comprises a motion control unit for controlling the transportation of the member to be recorded, and a film motion control unit for controlling the transportation of the film, synchronized with the transportation of the member to be recorded.

Another configuration of the present invention is a recording apparatus which comprises a heating element having a plurality of printing dots a plurality of buffers each having capacity for a plurality of scanning lines in responce to the printing dots of the heating elements, recording control unit for controlling the recording of the heating element in a predetermined order by use of the buffers, and motion control unit for controlling the transportation of the member to be recorded by the heating element.

7 Claims, 48 Drawing Sheets

RAM AREAS FOR IMAGE BUFFER

TRANSVERSE RANGE OF EFFECTIVE TRANSFER

LONGITUDINAL RANGE OF EFFECTIVE TRANSFER

FIG. 40

| ABBREVIATION FOR COMMAND | FUNCTION |
|---|---|
| SR 1 | STATUS 1 DEMAND |
| SR 2 | STATUS 2 DEMAND |
| SEL ON | SELECT LAMP ON |
| SEL OFF | SELECT LAMP OFF |
| PSEL | PRINT MODE SELECT |
| IDSEL | IMAGE DENSITY SELECT |

FIG. 41

| | DATA 8 | DATA 7 | DATA 6 | DATA 5 | DATA 4 | DATA 3 | DATA 2 | DATA 1 |
|---|---|---|---|---|---|---|---|---|
| SR1 | COMMAND | CELECT SW ON | READY | DENSITY (HIGH) | IMAGE | CASSETTE SIZE (3 BIT) | | |
| SR2 | | NO PAPER | PAPER JAM | COVER OPEN | NO INK | | | |

RECORDING APPARATUS

BACKGROUND OF THE INVENTION

1. Field of the Invention

The present invention relates to a nonimpact type recording apparatus which carries out recording by rapidly heating, with heating elements, a moving film that thas has numerous ink-filled pores, and by jetting out ink within numerous pores by means of the pressure of bubbles that are generated in heating.

2. Description of the Prior Art

Impact type recording apparatus is well known in the prior art, particularly ink jet printers.

The ink jet printer carries out printing by jetting out ink from nozzles onto a recording paper by the pressure created by a piezoelectric element, electrostatic force, or the like. While the ink jet printer has excellent aspects such as quietness, low power, ease in miniaturization, and so on, the nozzles tend to clog up, reducing the reliability of the device.

Further, there has been proposed a new recording apparatus which eliminates the drawbacks that existed in the prior-art ink jet printer (see Japanese Pat. No. 60-71260).

This recording apparatus uses a film that has, instead of nozzles, a multi-orifice portion that is formed by a multitude of orifices of diameter 10 to 200 μm. Ink is filled in numerous orifices, and the ink-filled multi-orifice portion is heated rapidly with heating elements. Recording is carried out by letting ink in the numerous orifices gush onto a recording paper as a result of the pressure of bubbles that are generated in the ink by the rapid heating.

Although such prior art apparatus proposed is able to eliminate the problem of clogging of nozzles, while maintaining the advantageous aspects of the ink jet printer, it has limited ability to improve the speed of the recording (printing) operation. Namely, due to the setup that recording on the recording paper is carried out by moving the film at constant speed all the time, when a large number of pages is to be printed a large time loss between printings is generated. Accordingly, it is desirable to increase the speed of a recording (printing) operation by optimizing the drive for moving the film in response to various conditions.

SUMMARY OF THE INVENTION

An object of the present invention is to provide a recording apparatus which is capable of a increasing the speed of recording (printing) operation.

Another object of the present invention is to provide a recording apparatus which simplifies the configuration of the apparatus through control of the film motion synchronized with the transportation of the member to be recorded.

Another object of the present invention is to provide a recording apparatus which operates a pulse motor for transporting the member to be recorded in a region of stable operation by controlling the pulse motor with acceleration steps and deceleration steps.

The present invention comprises a recording apparatus for recording data on a member wherein recording ink is filled with in a film a large number of minute orifices. Further is spouted ink from the minute orifices by means of the pressure of bubble generated through the heating of the ink with heating elements.

The present recording apparatus further comprises a motion control unit for controlling the transportation of the member to be recorded, and a film motion control unit for controlling the transportation of the film, synchronized with the transportation of the member to be recorded.

Another feature of the present invention is a recording apparatus including a heating element. The recording apparatus comprises a plurality of printing dots, a plurality of buffers each having capacity for a plurality of scanning lines in response to the printing dots of the heating elements, a recording control unit for controlling the recording of the heating element in a predetermined order by use of the buffers, and a motion control unit for controlling the transportation of the member to be recorded by the heating element. The recorded member motion control unit comprises a pulse motor for transporting the member to be recorded and a control unit for supplying a driving pulse so as to give the pulse motor both acceleration steps and deceleration steps. The buffer has a capacity to record the data that correspond to the acceleration steps and the line numbers that correspond to the deceleration steps.

These and other objects, features and advantages of the present invention will be more apparent from the following description of a preferred embodiment, taken in conjunction with the accompanying drawings.

BRIEF DESCRIPTION OF THE DRAWINGS

FIG. 40 is a diagram which shows the various kinds of commands that are sent out from the printer interface;

FIG. 41 is a diagram which shows the status of the print control unit;

DESCRIPTION OF THE PREFERRED EMBODIMENTS

Figure 1:
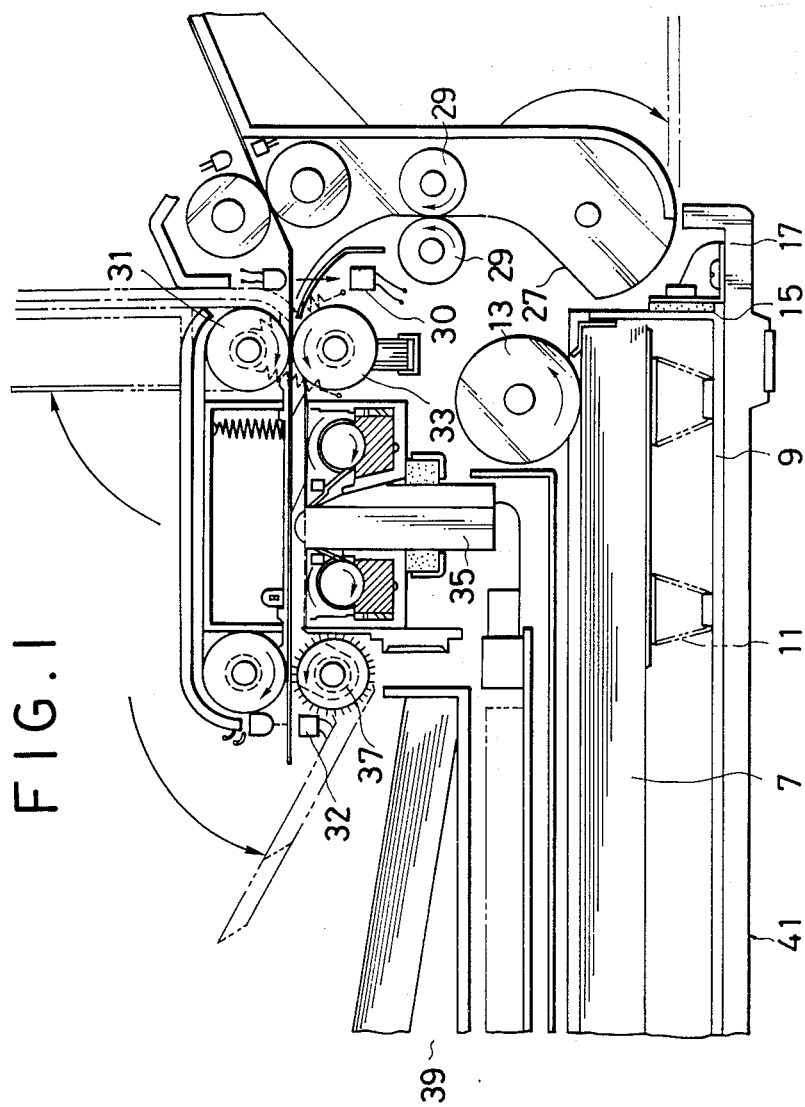
FIG. 1 and FIG. 2 are a side view and a front view which show the overall configuration of the recording apparatus in accordance with the present invention.

Referring to FIG. 1, there is shown a recording apparatus embodying the present invention.

As shown in FIG. 1, a recording paper (a member to be recorded) 7 is housed in a cassette 9, and is pushed upward by a pushing-up springs 11 to make a contact with a feed roller 13. On the cassette 9 there is provided a claw 15 for discriminating the size which turns on a cassette discrimination switch 17. In this way, the cassette size (of A4, B5, and so on) is discriminated.

In response to a recording start command from a print control unit that will be described later, the feed roller 13 causes a paper forwarding motor 19 shown in FIG. 2 to be rotated backward via gears 21 and 23 and a one-way clutch 25, to send recording papers 7 forward one sheet at a time. The recording paper 7 is raised along a first feed paper guide 27, transported while being held between the feed rollers 29, the tip of the paper is detected by a first paper detection sensor 30, and is put in order at the position where a first roller 31 and a resist roller 33 come into a rotational contact. The resist roller 33 is linked to the paper forwarding motor 19 via a one-way clutch unit (not shown in FIG. 1), and is rotated when the paper forwarding motor 19 is rotated.

The recording paper 7 which is put in order by the resist roller 33 is sent by the rotation of the resist roller 33 to a thermal head 35 where a predetermined printing is carried out on the recording paper 7 as will be described later. The recording paper for which recording is completed passes by a paper ejecting roller 37 and is ejected to a tray for ejected paper 39.

Figure 3:
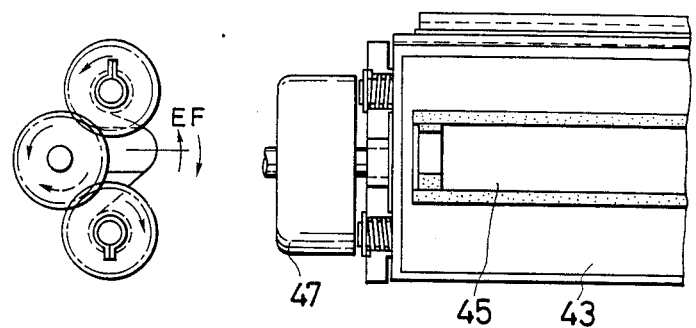
FIG. 3 is a partial block diagram of the film cartridge in the recording apparatus shown in FIG. 1.

The thermal head 35 is fixed to body 41, and a film cartridge 43, in which is housed a film 1, has a film exposure unit 45 with an aperture in a parallelepiped case, as shown in FIG. 3, and is set on the body 41 so as to enclose the thermal head 35 wich the exposure unit 45. On the outer side section of the film cartridge 43 there is provided a film driving motor (pulse motor) 47 by which film 1 is transported.

Figure 5:
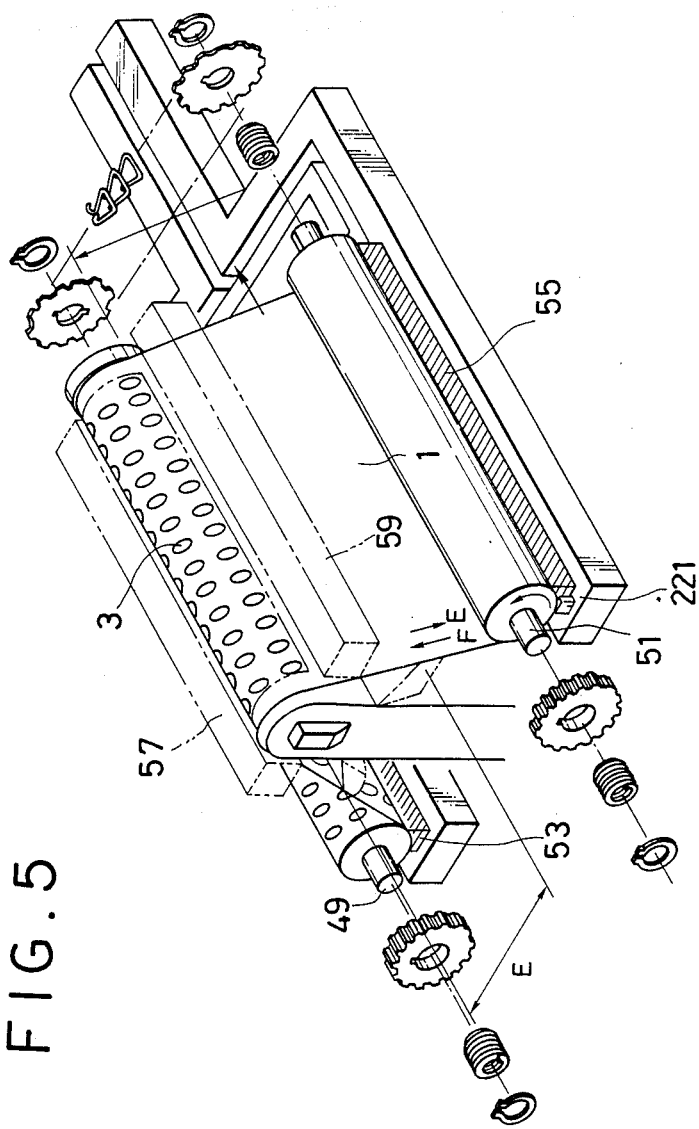
FIG. 5 is a overall block diagram for a the film driving mechanism.

As shown in FIG. 5, the film 1 has a multi-orifice portion 3 with a multitude of orifices of diameter 10 to 200 μm. The recording is performed by rapid heating of the ink-filled multi-orifice portion 3 by means of the heating element and by spurting ink from the ink-filled orifices to the recording paper 7.

[Control for Positioning and Transportation of the Film]

It is necesary for the present apparatus to be controlled so that the positions of both ends of the multi-orifice portion 3 are detected, and recording is started when the front end of the multi-orifice portion arrives above the heating element 5.

Figure 4:
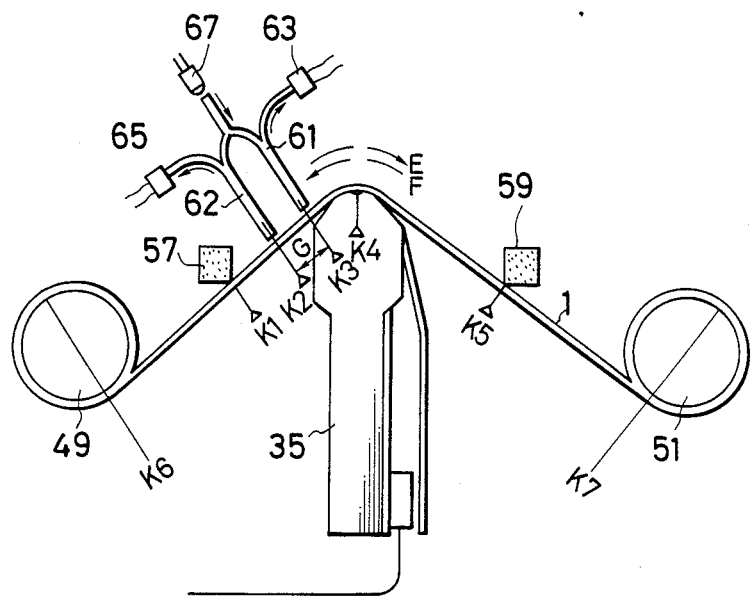
FIG. 4 is an explanatory diagram for film transportation control unit.

FIG. 4 shows the positional relationship between the film 1 and sensors for detecting the position of the film 1, with the thermal head 35 as the center.

The film 1 is driven in the E and F directions in the figure, centered around the thermal head 35, by the film driving motor 47, to be taken up by the paper winding shafts 51 and 49, respectively.

Futher, as shown in FIG. 5, the multi-orifice portion 3 of the film which is wound on each of the paper winding shafts 49 and 51, is filled with ink by making contact with ink supply members 53 and 55 made of felt and filled with ink. Ink which is attached to portions other than the multi-orifice portion 3 is scraped off with surplus ink scrapers 57 and 59.

Moreover, on the film 1 there are provided a first and a second film position detection fibers 61 and 62 which detect the position detection holes that will be described later. Both fibers 61 and 62 are positioned at the points $K_2$ and $K_3$, respectively, arranged with a separation of a distance G. At ends of both fibers 61 and 62 there are provided a first and a second photosensors 63 and 65 for detecting reflected light from the film 1. Reflected light is obtained by reflecting light, which is supplied from a light-emitting element 67, on the surface of the film 1 via the first and the second fibers 61 and 62.

Figure 6:
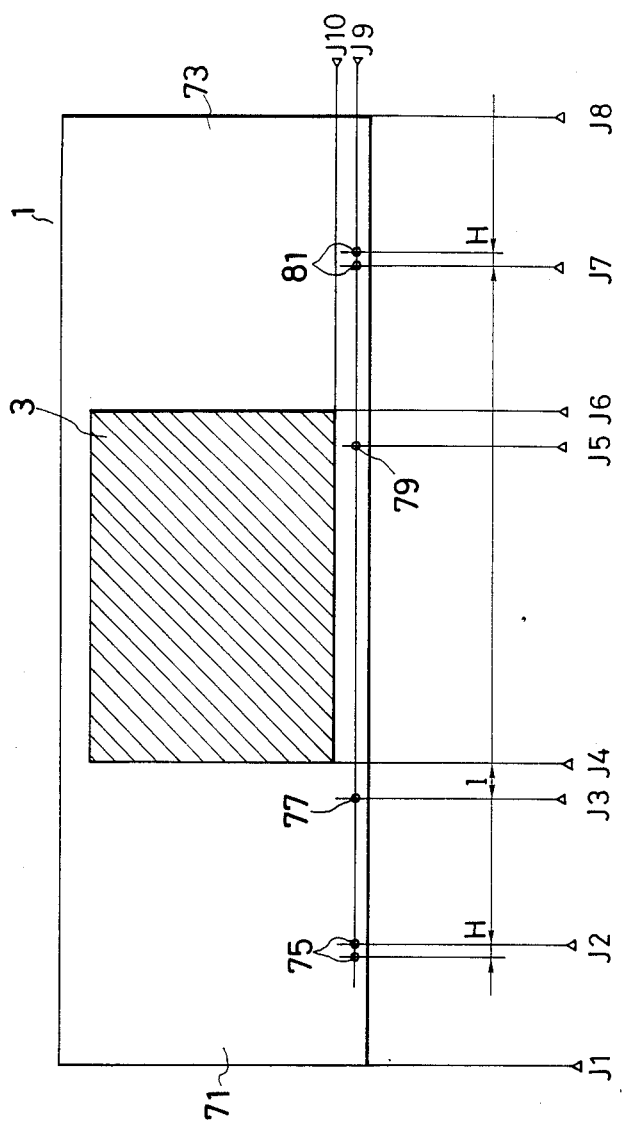
FIG. 6 and FIG. 7 are block diagrams for the film.
Figure 7:
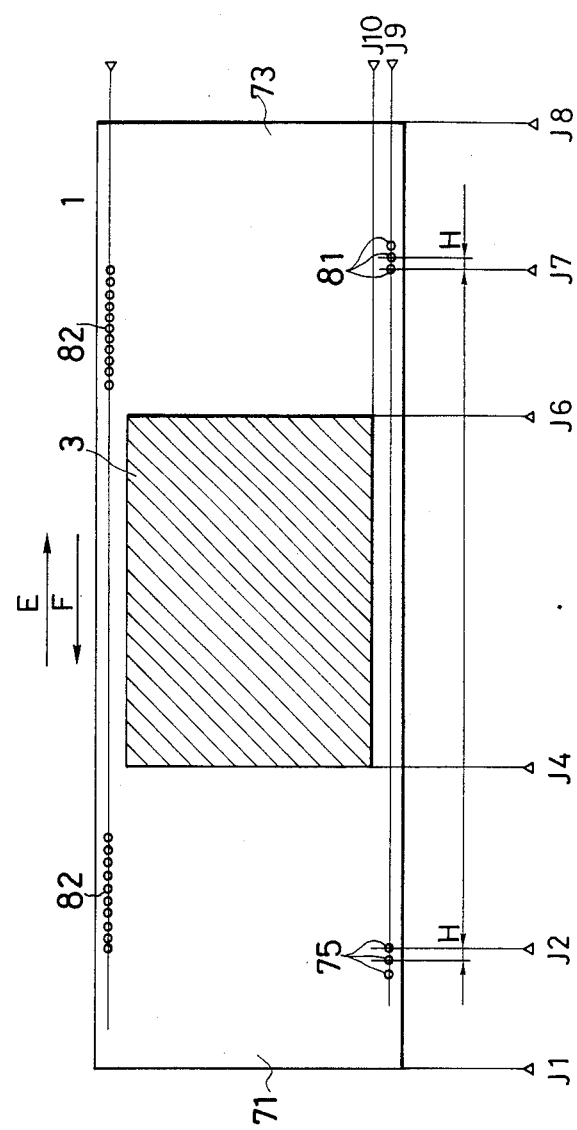

FIGS. 6 and 7 show examples of configurations of the film 1.

In the figures, the left side where there is not formed multi-orifice portion 3 is called the left base part 71, and the right side is called the right base part 73. The position detection holes 75, 77, 79 and 81 are holes that are provided on an end side J9 of the film 1 for detecting the film position by the film detection fibers 61 and 62.

The first position detection hole 75 on the left side is for indicating the completion of transportation of the film when the film is transported in the E direction, and the first position detection hole 81 on the right side is a corresponding detection hole when the film is transported in the F direction. The second position detection hole 77 on the left side is for indicating the print start position when the film is transported in the E direction and the print completion position when it is transported in the F direction. In addition, the second position detection hole 79 on the right side is for indicating the print start position when the film 1 is transported in the F direction and the print completion position in the E direction.

Further, the points J1 to J8 show the positions of the position holes and the numerous orifices. The point J1 shows the left edge portion of the film 1, J2 the first position detection hole 75 on the left side, J3 the second position detection hole 77 on the left side, J4 the left edge portion of the multi-orifice portion 3, J5 the second position detection hole 79 on the right side, J6 the right edge portion of the multi-orifice portion 3, J7 the second detection hole 81 on the right side, and J8 the right edge portion of the film 1.

The position detection holes 75 and 81 have a plurality of holes that have a pitch of H. The pitch of the holes H is equal to the distance G between the film position detection fibers 61 and 62.

Accordingly, if the positions other than those of the position detection holes 75 to 81 are at the positions of the points J2 and J3, the photosensors 63 and 65 are turned on by the reflected light from the film 1. On the other hand, if the position detection holes are at the positions of the points J2 and J3, the outputs of the corresponding photosensors 63 and 65 are in the off-state, and the detection of the position detection holes is carried out.

When the first position detection holes 75 and 81 come to the points J2 and J3, the output of both of the photosensors becomes off-state. However, the outputs of the photosensors 63 and 65 will not be in off-state simultaneously since the second position detection holes 77 and 81 are single holes individually. The drive control of the film 1 is carried out by detecting the film detection holes in the above fashion.

On the other hand, in the film configuration example shown in FIG. 7, there are provided a plurality of moving detection holes 82 of a predetermined spacing on the film end portions which face the position detection holes 75 and 81. The drive control of the film 1 is carried out as will be described later by detecting the moving detection holes 82 with a film motion detection sensor 66.

[Structure of the Thermal Head]

Figure 8:
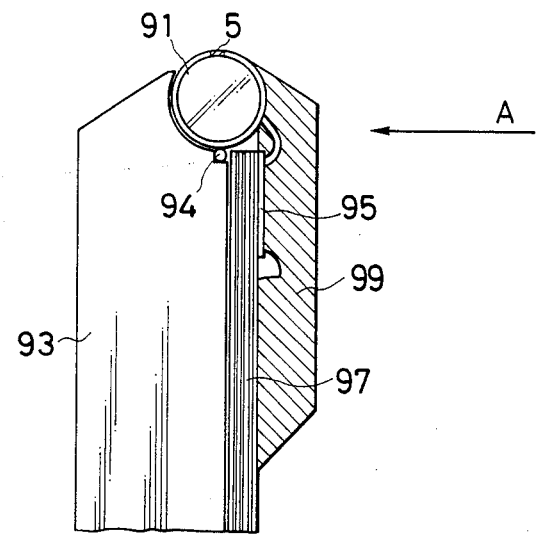
FIGS. 8 and 9 are overall block diagrams of the thermal head.
Figure 9:
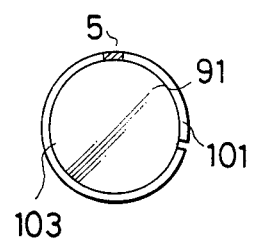
Figure 10:
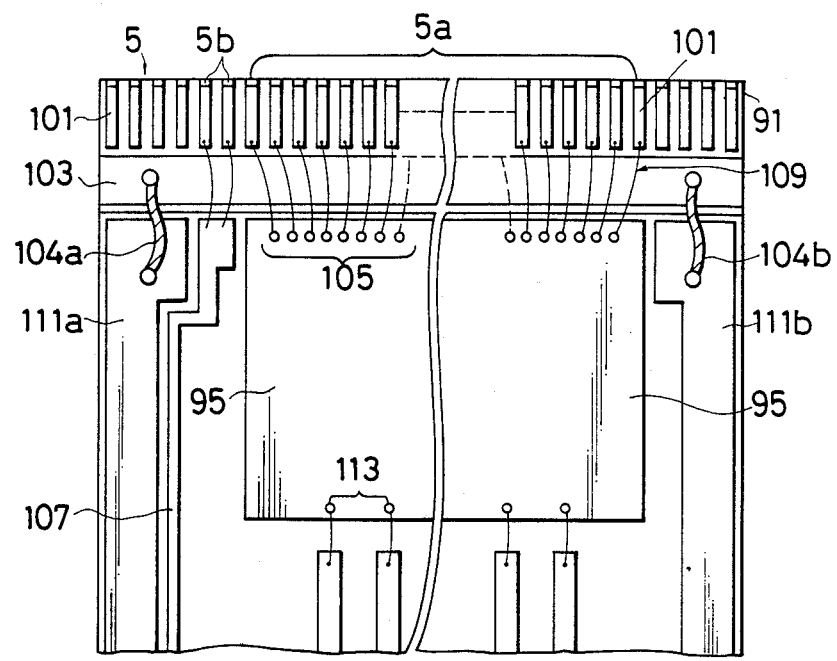
FIG. 10 is an overall block diagram of the thermal head as seen from the direction of the arrow A in FIG. 9(A)
Figure 11:
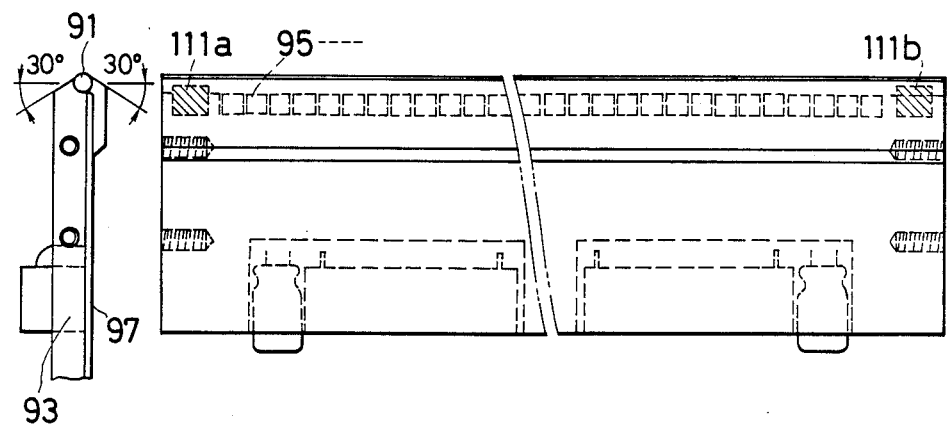
FIG. 11 is an overall block diagram as seen from the rear side of the thermal head.

FIG. 8 depicts an overall cross section of the thermal head 35. FIG. 9 is a cross section of the rod portion of the thermal head 35. FIG. 10 is a side view from the direction of the arrow A in FIG. 8. FIG. 11 is an overall block diagram of the thermal head 35.

The thermal head 35 includes a metallic rod 91 on which are formed numerous heating elements 5, a supporting member 93 made of aluminum which supports the rod 91 and radiates the heat of the rod 91, a thermistor 94 that makes contact with the lower part of the rod 91 for detecting the temperature of the thermal head 35, and a PC plate 97 that is joined to the surface of the supporting member 93 for mounting LSI's 95 that drive the heating elements 5. The driving LSI's 95 are covered with a protective layer 99 made of epoxy resin.

In addition, as shown in FIG. 9, there are formed on the rod 91 an electrode pattern 101 on a driving side and an electrode pattern 103 on a common side, of the heating elements 5.

The heating elements 5 that are formed in large number on the rod 91 consist of, as shown in FIG. 10, the heating elements (effective heating elements) 5a that are used for actual printing and the heating elements (heating elements for control) 5b that are used for feedback control of the printing conditions.

The electrode pattern 101 on the driving side of each of the effective heating elements 5a is connected to the corresponding output signal pad 105 of the driving LSI 95, and the electrode pattern 101 on the driving side of the heating elements for control 5b is connected to the heating element lead-out pattern for control 107, respectively, with bonding wires 109. Further, the electrode pattern on common side 103 of the heating elements 5 (5a and 5b) is connected to the driving power supply patterns 111a and 111b that are formed on both sides of the heat unit, by common lead lines 104a and 104b.

A driving LSI 95 of the present embodiment has 32 output signal pads 105, and is driven by a time division of a 32-bit unit as will be described later. In addition, the number of driving LSI's 95 used is 54, and the number of effective heating elements 5a is 1,728.

Consequently, the effective heating elements 5a are driven by time division of a 32-bit unit so that the current that flows in the electrode pattern on common side 103 is considerably smaller than that in the thermal head which is ordinarily in use. Therefore, it is possible to prevent inconveniences due to voltage drop, heating of electrodes, and so forth.

[Internal Circuit of the Thermal Head]

Figure 12:
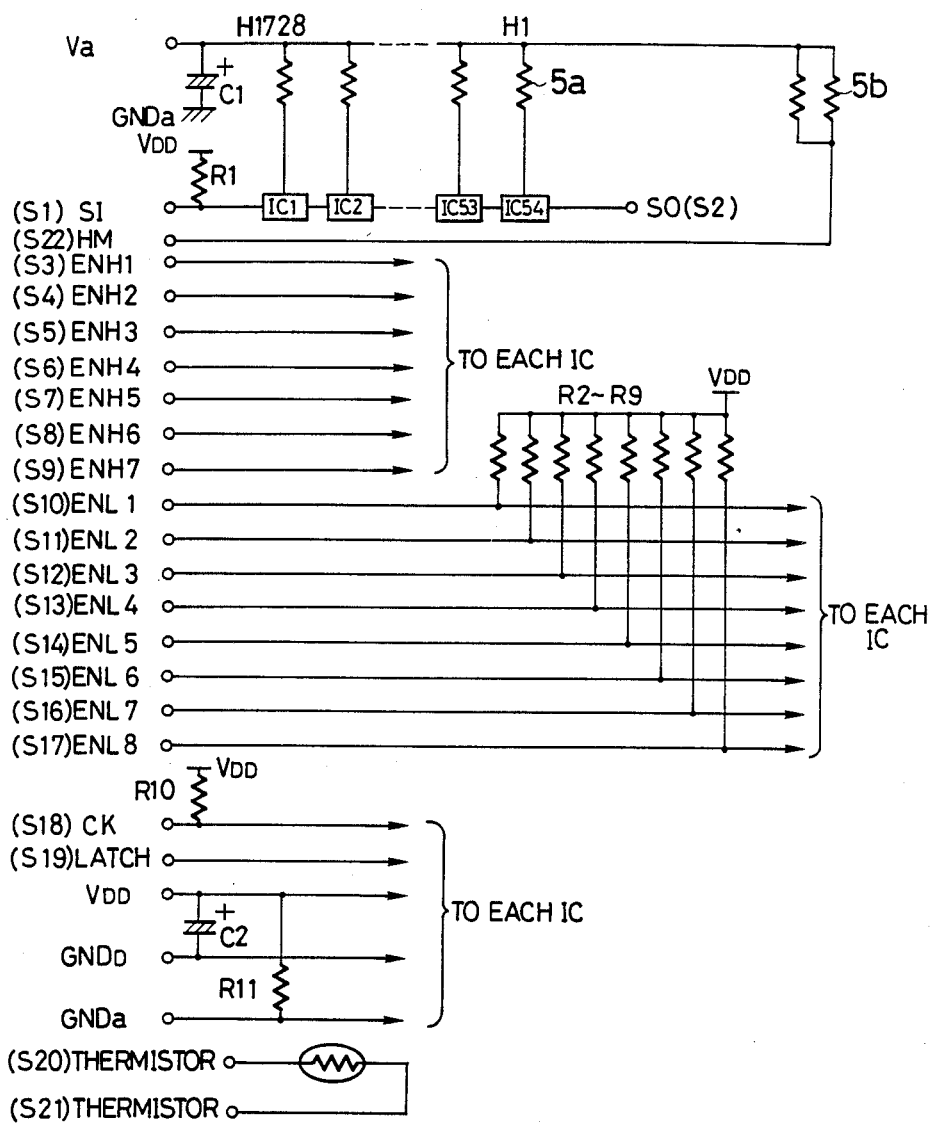
FIG. 12 is a diagram which illustrates the internal circuit of the thermal head along with the time division driving signals.
Figure 13:
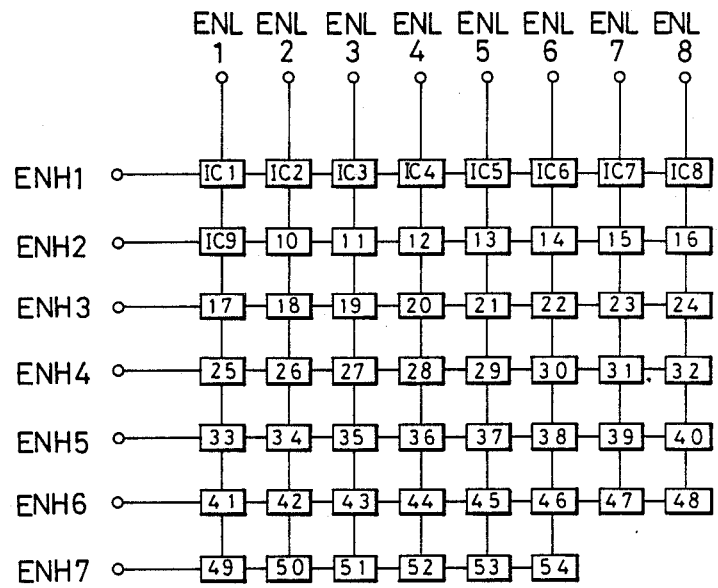
FIG. 13 is a diagram which illustrates the driving LSI that is designated by the time division driving signals.
Figure 14:
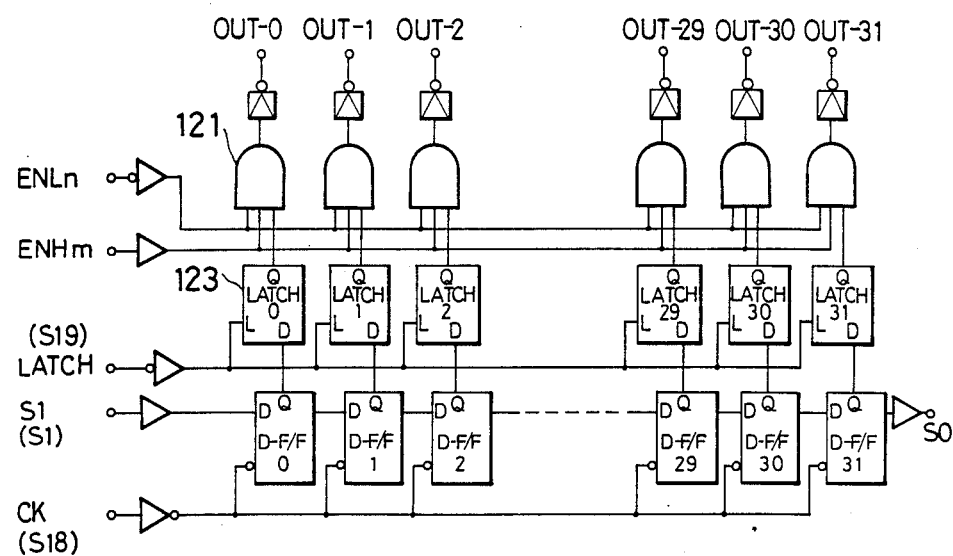
FIG. 14 is a block diagram which shows the internal circuit of the driving LSI.

FIG. 12 through FIG. 14 show the internal Circuits of the thermal head 35.

A driving supply voltage (+24 V) Va from a power supply unit 191, that will be described later, is supplied to the heating elements (H1 to H1728) of the effective heating elements 5a. In addition, each of the effective heating elements 5a is connected to each of the output terminals of the corresponding driving LSI (IC1 to IC54) as mentioned earlier.

To the serial input (SI) terminal of IC1 there is supplied a serial input data signal S1, and the serial output (SO) terminal of IC1 is connected to the SI terminal of the next IC2. In this way, IC1 to IC54 are connected in series so that a printing data that is input to the SI terminal of IC1 is shifted successively to IC54.

Namely, a serial printing data which is input synchronized with the shift clock (CK) S18 that will be described later, is held in the shift register within IC1 to IC54, a latch signal S19 is supplied on completion of input of the serial printing data, and is latched in each latch within IC1 to IC54. From latch data, one IC is selected successively from among IC1 to IC54 by the time division driving signals ENH1 to ENH7 (S3 to S9) and ENL1 to ENL8 (S10 to S17), as shown in FIG. 13. In this way, the effective heating elements 5a are driven by time division at a unit of 32-bits. In FIG. 12, $V_{DD}$ is a logic power supply (+5 V) for IC1 to IC54 and 94 is a thermistor for temperature detection of the thermal head 35, with its output terminals at S20 and S21.

Each IC (driving LSI95) is constructed as shown in FIG. 14. To a gate input terminal ENLn there are supplied time division driving signals ENL1 to ENL8, and to a gate input temrinal ENHm there are supplied time division driving signals ENH1 to ENH7, via an inverter or a buffer. To a 3-input AND gate 121 there are supplied time division driving signals ENLn, ENHm, and the output signal of a latch 123. Accordingly, only a bit for which three conditions are satified, namely, "H" level for the latch output, "L" level for ENLn, and "H" for ENHm will be driven by the driver.

[Relationship between A Host-Side System and the Present Apparatus]

Figure 15:
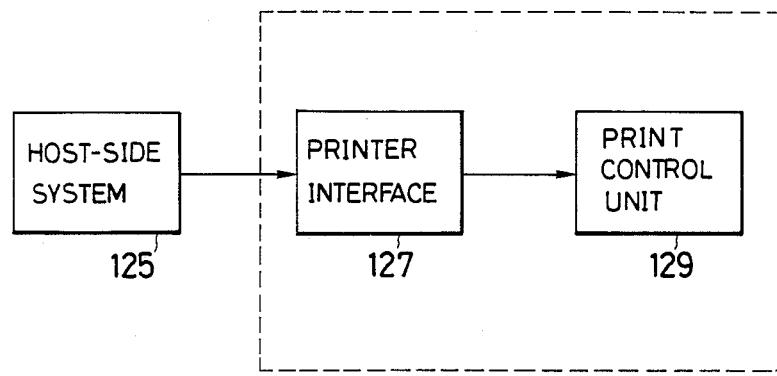
FIG. 15 is a block diagram which shows the relation between the host side system and the recording apparatus.

FIG. 15 shows the relationship between a host-side system and the present apparatus.

The host-side system 125 may be, for example, an office computer which sends out a printing data and a command data to a printer interface 127. Upon receipt of a command data, the printer interface 127 sets up the printing mode for the print control unit 129.

The printing data includes character data and bit image data. The character data is sent out, after it is developed into a bit image for the character by a character generator in the printer interface 127, to the print control unit 129. The bit image data, on the other hand, is sent out to the print control unit 129 as it is.

[Configuration and Operation of the Printer Interface]

Figure 16:
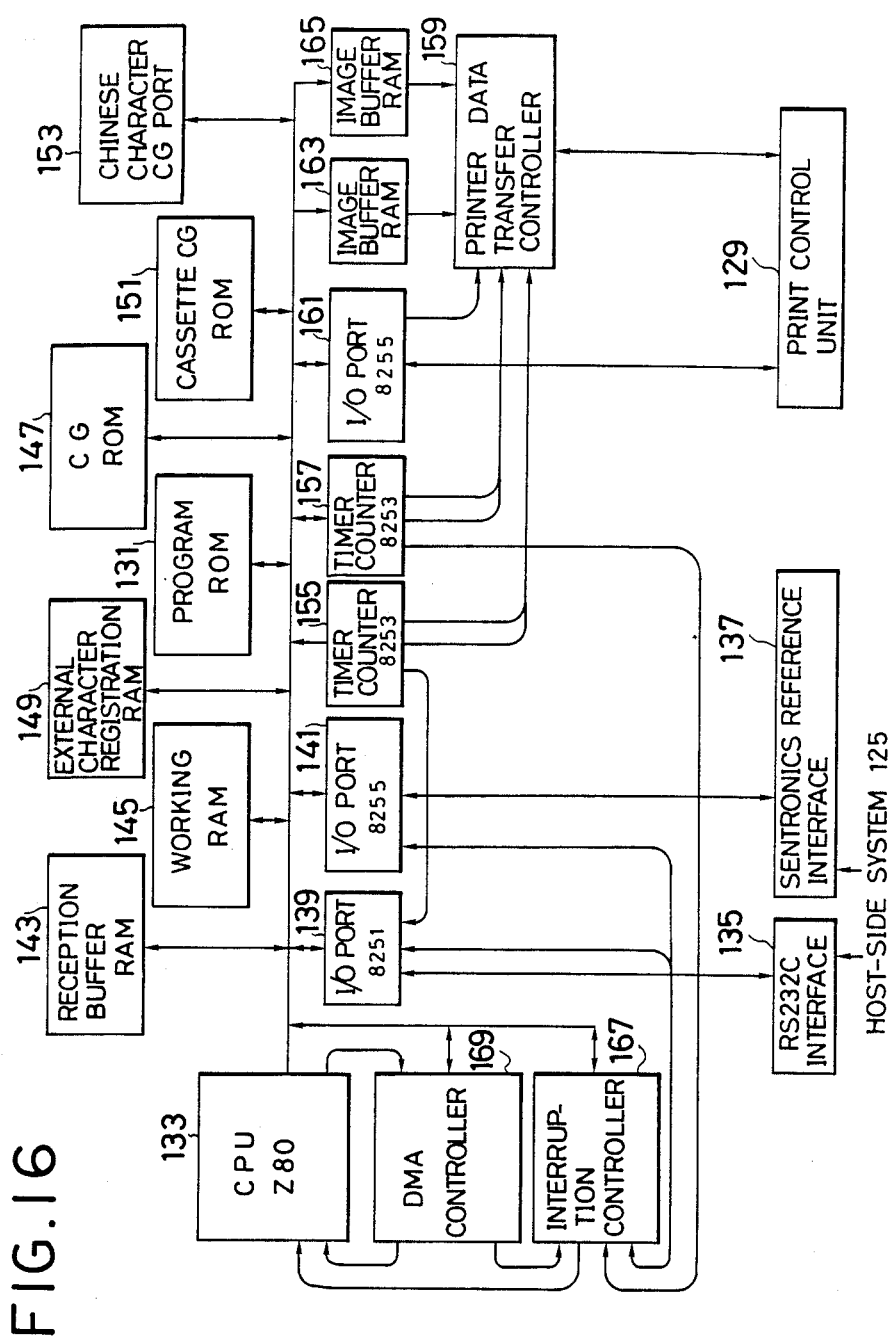
FIG. 16 is a block diagram which shows the configuration of the printer interface.
Figure 17:
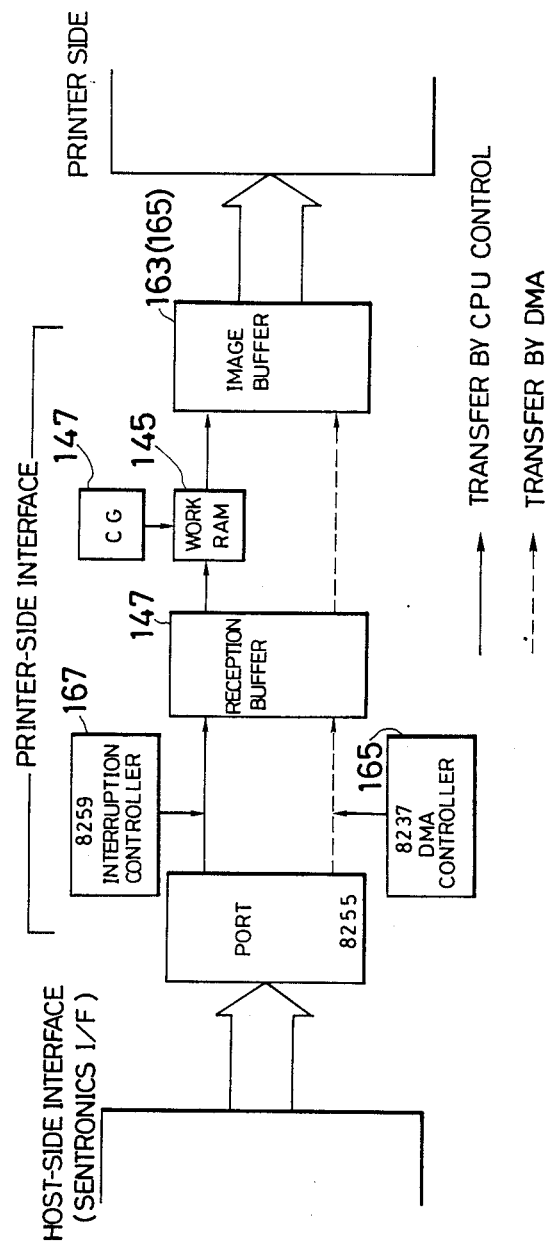
FIG. 17 is an explanatory diagram for data transfer by interruption control and DMA control.

FIG. 16 shows the configuration of the printer interface 127.

The printer interface 127 is controlled by a microprocessor (CPU) 133 according to a control program that is housed in a program ROM 131.

The data (printing data and command data) from the host-side system 125 is input via the interfaces 135 and 137. The interface 135 is a general purpose serial interface and use is made, for instance, of RS-232C. In addition, the interface 137 is a general purpose parallel interface according to Sentronics. Further, serial communication control is carried out by an input-output port 139, and parallel communication control is carried out by an input-output port 141.

An input data is stored temporarily in a reception buffer RAM 143. When the input data is a character, the data in the reception buffer RAM 143 is developed into a bit image by using a working RAM 145.

A character generating ROM (CGROM) 147 stores character patterns that are predetermined. In using a character which is not stored in CGROM 147, a character pattern loaded from the host-side system 125 is stored in an outside character registering RAM149. A cassette CGROM151 is a freely attachable and detachable ROM which stores character patterns other than those in the CGROM147. In Chinese character CG port 153 there are stored Chinese character patterns of mainly first and second JIS levels.

Timer-counters 155 and 157 are programmable counters which carry out various kinds of time control and counter control for a reference clock to the input-output port 139, for serial communication and for a printer data transfer controller 159.

Parallel I/O port 161 transmits and receives control signals between the print data transfer controller 159 and the print control unit 129.

Bit image data is stored temporarily in the two image buffers RAM163 and 165 and they are used alternately when transmitting data to the print control unit 129.

The print data transfer controller 159 controls transmission of data to the print control unit 129.

In the present embodiment, there are two methods of transferring data from the host-side system 125. The first method of transferring data is via CPU133 by using an interruption controller 167. The second is method second is sending it directly to the reception buffer 143 by using DMA controller 169. The selection between the two is made by a command from the host-side system 125.

In the former case, the character data which was stored temporarily in the reception buffer 143 is transferred to the working RAM 145, and is transformed to a predetermined character form via the CGRAM147. The transformed bit image data is controlled to be transferred to image buffers 163 and 165.

In the latter case which is used by mainly for printing image data, image data which is DMA transferred to the reception buffer 143 from the host-side system 125 is transferred directly to the image buffers 163 and 165 from the reception buffer 143. The bit image data that is transferred to the image buffers 163 and 165 is the transferred to the print control unit 129.

Figure 18:
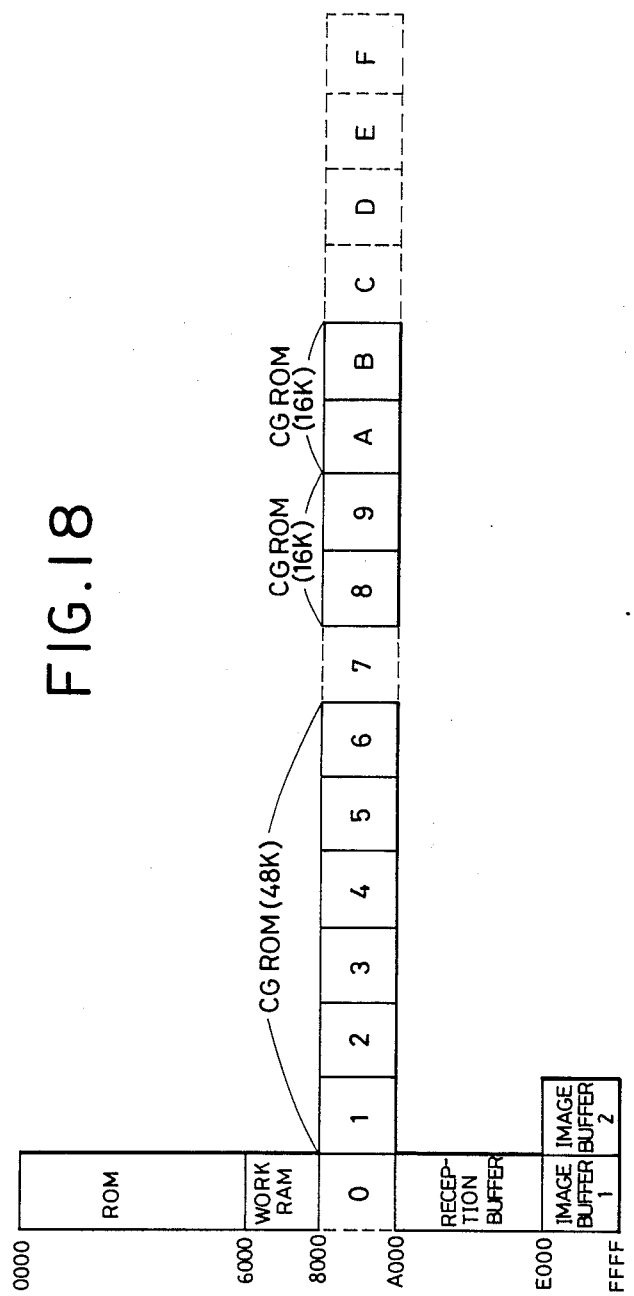
FIG. 18 is a diagram which shows the memory may of the memories within the printer interface.

FIG. 18 shows a memory map of various kinds of memories within the printer interface 127.

The addresses "0000" to "5FFF" are for the program ROM131, the addresses "6000" to "7FFF" are for the working RAM145, and the addresses "8000" to "9FFF" are for are for CGROM147 and for external character registering RAM149, and these addresses are divided by the banks from 0 to F. The addresses "A000" to "DFFF" show the reception buffer 143, and the addresses "E000" to "FFFF" show the image buffers 163 and 165.

Figure 19:
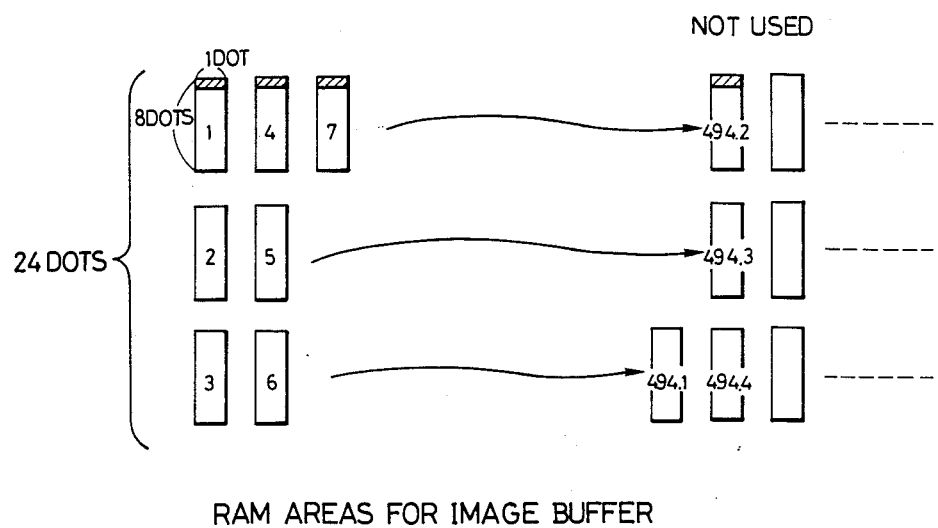
FIG. 19 is a diagram which shows the RAM areas of the image buffer.

FIG. 19 shows the configuration of the RAM areas of the image buffers 163 and 165. In the present embodiment, print is done in a group of 1 dot 1 line (hatched portion of the figure) so that the data written in the RAM in the order of addresses 1, 2, 3, ..., 494.4 are read when outputting the data transformed in the address order of 1, 4, 7, ..., 494.2, 3, 6, ..., 494.4. The address operation is carried out by an address transformation circuit in the print data transfer controller 159. It is carried out by counting the video clock signal VCLK1 with a counter, and by transforming the counted value with a specified ROM.

Figure 20:
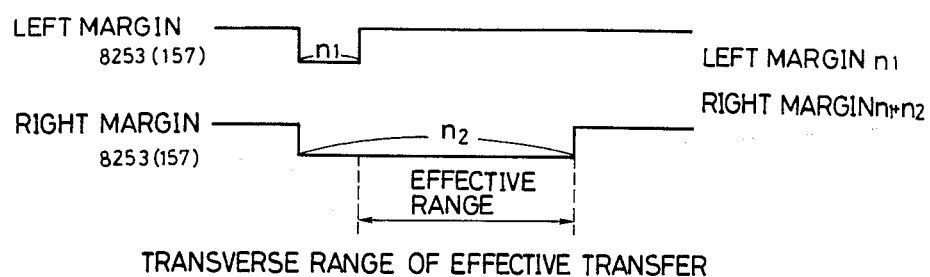
FIG. 20 and FIG. 21 are time charts which show the state of effective data transfer from the image buffer.

FIG. 20 is a time chart which shows the state of effective transfer in the transverse direction from the image buffers 163 and 165.

The effective range in the transverse direction is prescribed by using two timers in the timer 157 shown in FIG. 16. Namely, the effective range in the transverse direction in transferring the data in the image buffers 163 and 165 by the programmable timer 157, is determined by the exclusive-OR operation of the left margin and the right margin in FIG. 20. The left margin uses MODE 1 of counter #1 in the programmable timer (8253) 157, and the right margin uses MODE 1 of counter #2. Therefore, by applying the video reference clock VCLK1 at the time of transferring the data to the print control unit 129, to the clock input of the counter, there are obtained outputs n1 and n2 that correspond to the set values in the counter. By the gate in the print data transfer controller 159, only the portion that corresponds to n2-n1 of the data in the image buffers 163 and 165 is output to the print control unit 129 as the effective printing data.

Figure 21:
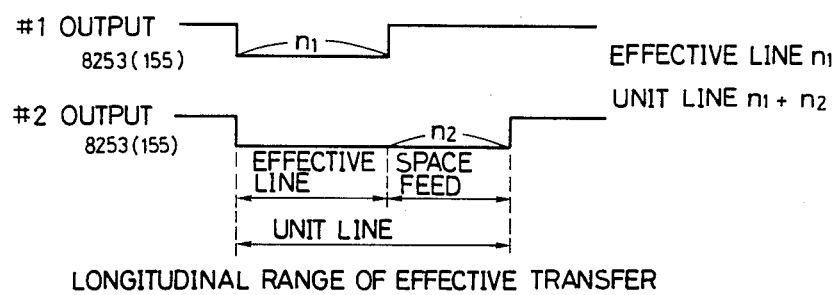

Moreover, the effective transfer range in the longitudinal direction is prescribed as shown in FIG. 21. Namely, of a plurality of programmable counters 155, the effective line in the longitudinal direction is determined by the operation of MODE 1 of counter #1 and the unit line in the longitudinal direction is determined by the operation of MODE 1 of counter #2. Accordingly, of the data in the image buffers 163 and 165, only n1 lines that will become effective lines are transferred to the print control unit 129 as the effective printing data. Further, for n2 in FIG. 21 dead data is sent out as a space. In this way, control in the longitudinal direction in printing characters is carried out for character printing portion for one line and for the space.

By repeating a plurality of controls for one line, printing for the entire surface of a paper of certain size is accomplished. Further, if the printing data is an image data, the above control is not applied, and all lines in the image buffer 24 are transferred to the print control unit 129 without space control.

[Configuration of the Print Control Unit]

Figure 22:
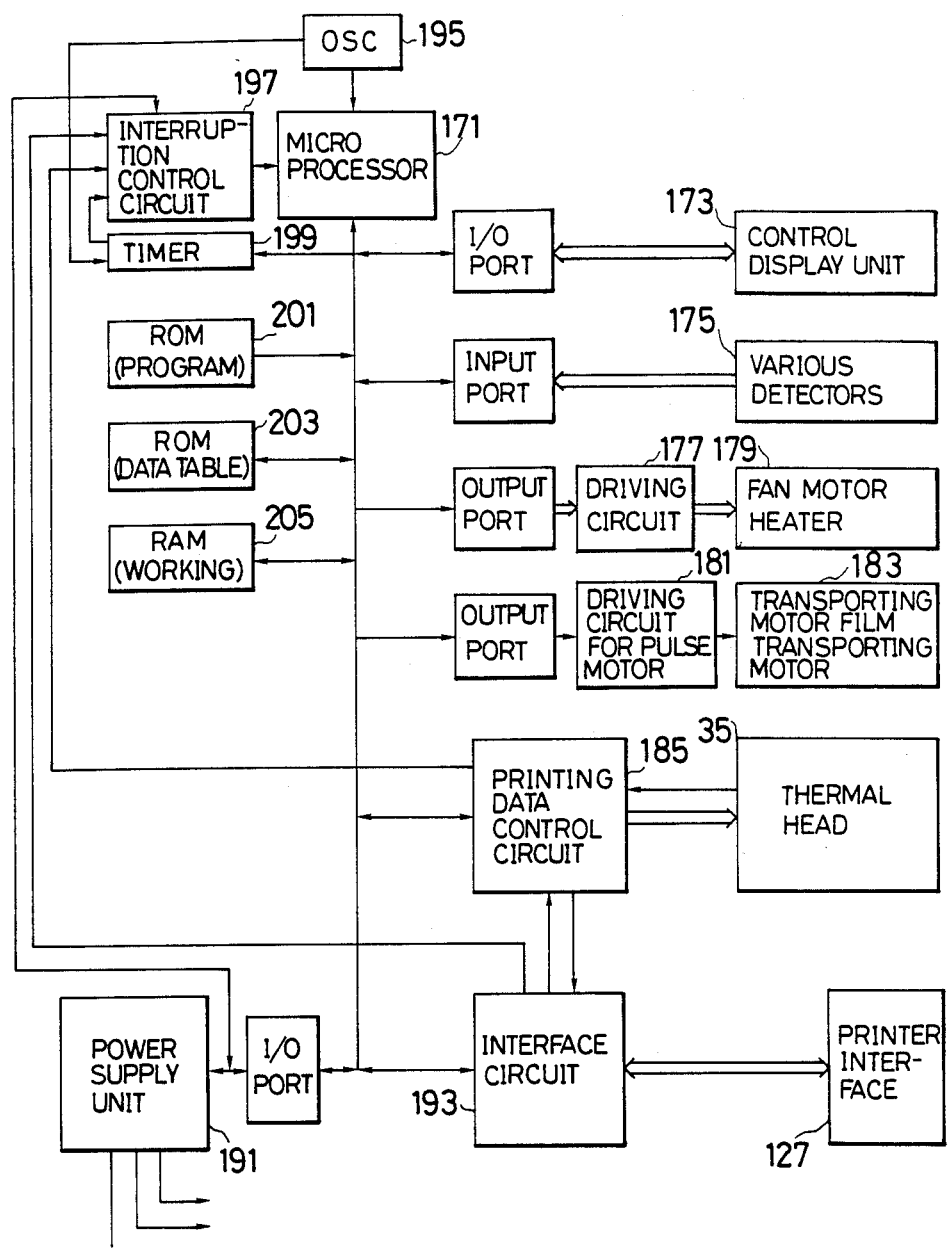
FIG. 22 is a block diagram which shows the configuration of the print control unit.

FIG. 22 shows the configuration of the print control unit 129.

The print control unit 129 is constructed with the microprocessor 171 as the control center. Its input-output ports are connected to a control display unit 173 that is provided with control keys and lamps for displaying the operational conditions, various detectors 175, a fan motor and a heater 179 via a driving circuit 177, a pulse motor for transporting recording paper and a film transporting pulse motor 183, via a pulse motor driving circuit 181, a printing data control circuit 185, and the printer interface 127, via a power supply unit 191 and an interface circuit 193.

In addition, the print control unit 129 includes an oscillator (OSC) 195 which generates reference clocks that are supplied to various timer circuits, microprocessor 171, and others within the print control unit 129, an interruption control circuit 197 which controls the demands for interruption that come from the printing data control circuit 185, the interface circuit 193, a timer 199, a program timer 199 with a plurality of channels that control the mechanical timings (for paper feeding, paper check, and various kinds of motors) of the print control unit 129, a ROM201 with built-in control program, a ROM 203 for data table with built-in timing data of various kinds, and a working RAM205.

The components of the print control unit 129 mentioned above will be described in detail below.

[Configuration of Various Kinds of Detectors]

Figure 23:
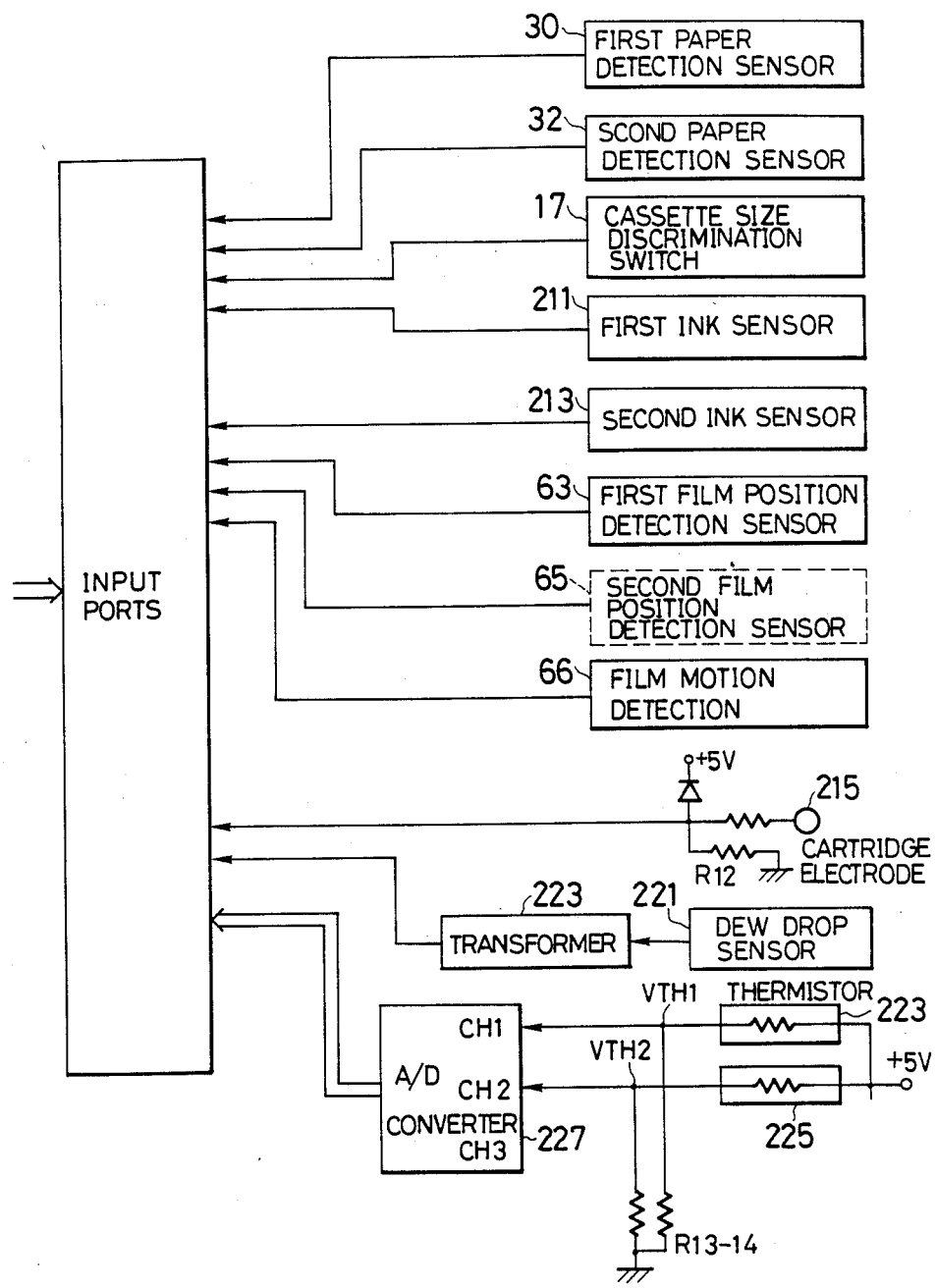
FIG. 23 is a block diagram which shows the configuration of each detector in FIG. 22.

FIG. 23 shows the various kinds of detectors 175.

Figure 2:
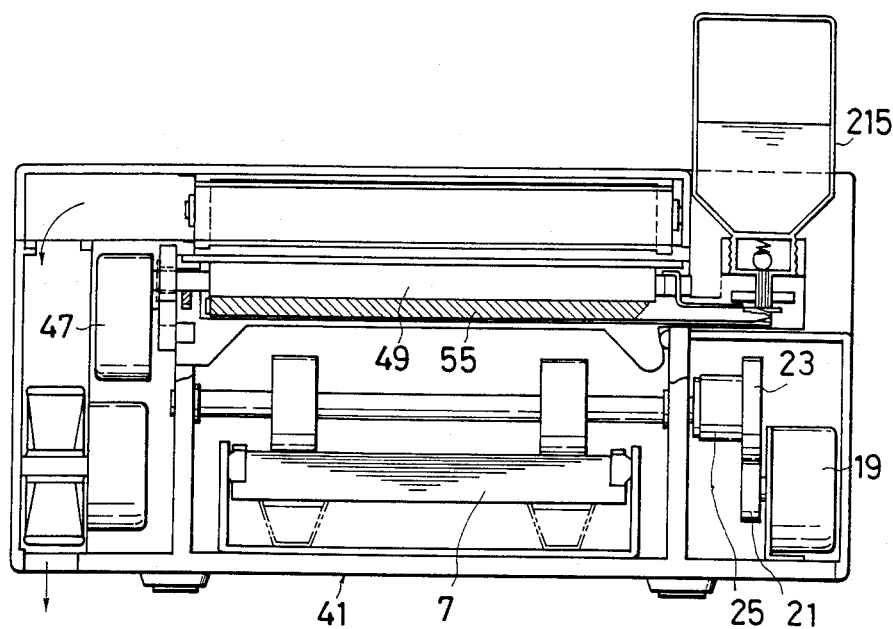

The first paper detector 30 is a sensor consisting of a light-emitting element and a light-receiving element which is provided in front of the resist roller 33 in order to detect the recording paper 7 that is sent, as shown in FIG. 2.

The second paper detector 32 is a sensor which consists of a light-emitting element and a light-receiving element that is provided immediately after the paper ejecting roller 37 in order to detect whether or not the printed recording paper 7 is ejected normally from the paper ejecting roller 37.

The cassette size discrimination switch 17 is a switch to discriminate the cassette size as mentioned earlier.

The discrimination signal of the cassette size discrimination switch 17 is supplied to the microprocessor 171 to control the energizing of the heating element 5 in the width direction of the recording paper 7 in accordance with the size of the recording paper 7. Thus, when the width of the paper 7 is less than the width of the film 1, the heating elements 5 on the outer edge of the film are not energized.

As a result, a guide portion belt, or the like adjacent to the the termal head 35 and the next sheet of printing paper 7 are not inadvertently stained with excess ink.

Figure 24:
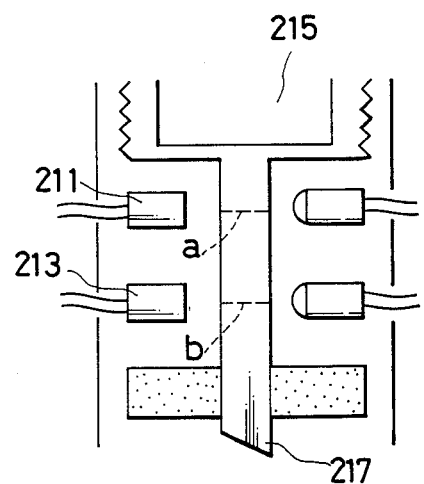
FIG. 24 is an explanatory diagram for detection operation of ink quantity.

A first ink sensor 211 and a second ink sensor 213 are switches for detecting the quantity of recording ink in an ink container 215, as shown in FIG. 24, each consisting of a light-emitting element and a light-receiving element. In FIG. 24, when ink is consumed, the ink level drops and approaches a level of a transparent tube 217. If the ink level drops below the position a in the figure, it is detected by the first ink sensor 211. This state of NO Ink is displayed in the control display unit 173, and indicates to the operator the necessity to replace the ink container 215. When the ink level drops below the position b in the figure, the second ink sensor 213 detects this and unconditionally halts the printing operation. In other words, during printing of data from the host-side system 125, even if the first ink sensor 211 detects "NO INK," an inkless signal for halting the printing operation will not be sent out to the host-side system 125. When printing for one page is completed, then a NO INK signal is sent out to stop printing. Accordingly, the first ink sensor 211 and the second ink sensor 213 arranged, in the case of printing ordinary characters, images, and the like, in such positions where the second ink sensor 213 will not detect an inkless state.

Figure 25:
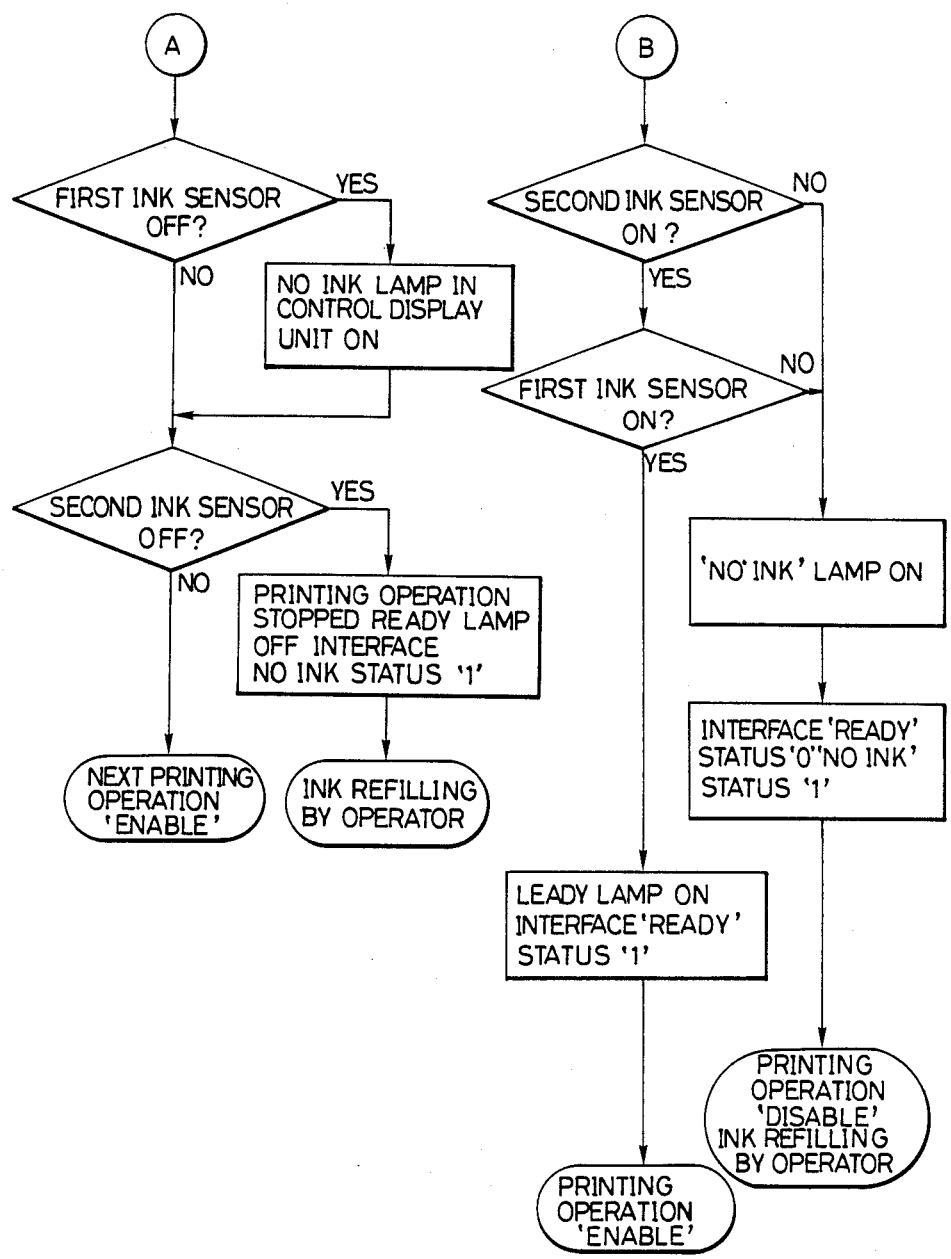
FIG. 25 is a flow chart which shows the procedure of ink refilling processing.

After the operator exchanges the ink container 215 and the power supply is turned on, the microprocessor 171 gives a permission to print to the host-side system 125 after both the first and second ink sensors 211 and 213 detect the state of "PRESENCE OF INK". Namely, permission to print is not given to the host-side system 125 by the "NO INK" detection by the second ink sensor 213 alone, so that ink refilling can be carried out accurately. The ink supply processing in the above is summarized and shown in FIG. 25.

The first film position detection sensor 63, the second film position detection sensor 65, and the film motion detection sensor 66 are for detecting the position and the motion of the film 1, as mentioned earlier.

An ink cartridge electrode 215 is mounted to make contact with the paper winding shaft 49 or 51 of the film 1, and is used for detecting the electrically connected state due to rupture of a protective film on the heating elements 5. Namely, in this state, the driving voltage for the thermal head 35 is applied to the film 1, and the same voltage is applied to the electrode 215. This applied voltage is supplied to the input port as a detected signal, by flowing out via a resistor R12. The microcomputer 171 stops the driving of the thermal head 35 by receiving the detected signal.

Accordingly, if the heating elements 5 are brought in contact state with the film 1 due to puncture of its protective film, it can be detected immediately and the driving of the thermal head 35 can be brought to a stop. Therefore, there having a puncture of the film 1 or a burning of the apparatus as a whole that may be caused by the fracture of the protective film, and the safety of the apparatus can be secured.

Further, the case of the film cartridge 43 is formed with a nonconductive member and hench is insulated from the casing of the apparatus body. Therefore, even if a voltage is applied to the film 1, differing from the case of an ordinary recording apparatus in which the grand line of the signal system is connected to the casing, a short-circuit current will not flow between the casing of the apparatus and the power supply line, thereby preventing electrification, burning of film, and burning of the parts in the appratus.

A dew drop sensor 221 makes contact with an ink supply member 53 as shown in FIG. 6 and is mounted at a position which is farthest from the ink container 215.

The dew drop sensor 221 detects the amount of ink in the ink supply member 53. Its resistance is low when state a sufficient amount of ink (dew forming state is present) in the ink supply member 53. If the amount of ink in the ink supply member 53 decreases, there arises a state of nonformation of dew, and its resistance is increased. The change in the value of resistance is converted to a binary signal in an exchanger 223 and is read by the microprocessor 171 via the input port.

Figure 26:
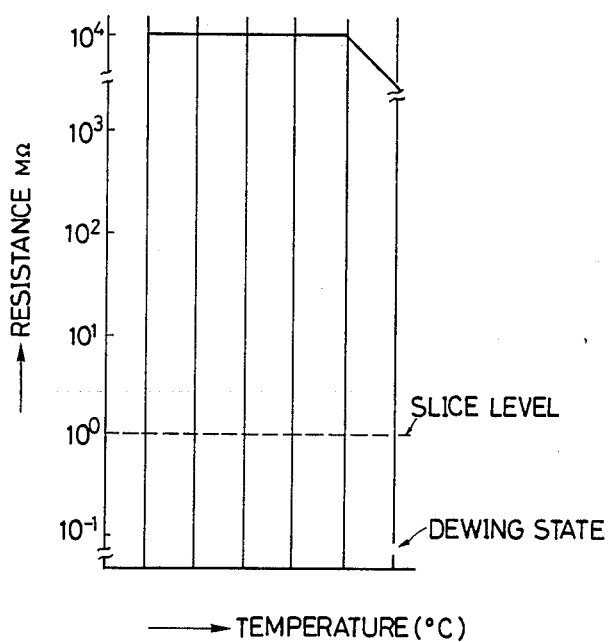
FIG. 26 is a characteristic diagram for a dew drop sensor.

FIG. 26 shows the variation of resistance against the humidity of the dew drop sensor 221. Since the resistance of the dew drop sensor 221 changes sharply in the dew forming state (immediately before the humidity of 100 %) it is possible to have a stable detection of the dew forming state. In the figure, the slice level for binary coding is set at the resistance of 10K.

The microprocessor 171 permits the printing operation only when the dew formation state is detected, and the printing operation is halted when the amount of ink drops below a predetermined level.

Therefore, missing characters in print due to nonfilling of ink in the multi-orifice portion 3, and abnormal rise in temperature and damages to the thermal head 35 can be prevented. Moreover, the dew drop sensor 221 is attached to a position farthest away from the ink container 215 and detects the dew formation state only when ink has infiltrated sufficiently well all over the ink supply member 53, so that dispersion in the amount of ink can be prevented without generating unevenness in printing.

Thermistors 223 and 225 are for detecting the temperature of the ink supply member. The detected signals are supplied via an A/D converter 227 to the microprocessor 171, and the thermal insulation heaters 228 and 229 (see FIG. 27) are controlled so as to keep the ink temperature constant.

Figure 48:
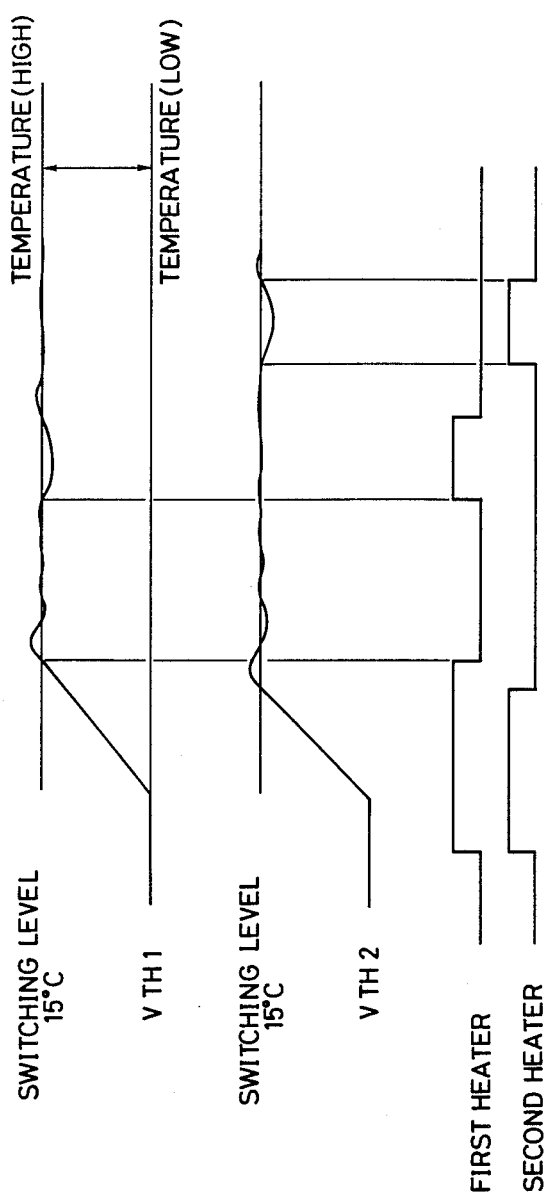
FIG. 48 is a diagram which shows the ink temperature control state.

FIG. 48 is a diagram which shows the state in which the temperature of ink in the ink cartridge is controlled.

In the figure, $V_{TH1}$ and $V_{TH2}$ are the voltages at the junction of the thermistor 223 and the resistor R13, and at the junction of the thermistor 225 and the resistor R14, respectively. Accordingly, the voltage at the former junction varies with the temperature detected by the thermistor 223. Namely, when the temperature is low, the resistance of the thermistor 223 becomes high, and hence the voltage at that point becomes high. On the contrary, when the temperature is high, the voltage becomes low.

The microprocessor 171 reads the voltages $V_{TH1}$ and $V_{TH2}$ as digital information via the A/D converter 227, and compares them with the comparative data in the temperature control data table (here, the comparative data are the values obtained by digitally converting $V_{TH1}$ and $V_{TH2}$ at the control temperature of 15° C.). It it is found that $V_{TH}$ is smaller than the comparative data as a result of the comparison, the thermal insulation heater that corresponds to the thermistor 223 is turned on. In the opposite case, the thermal insulation heater is turned off.

Accordingly, the ink temperature is kept in a fixed range (15° C. to 30° C.) so that properties of the ink, particularly viscosity, can remain constant, and degradation in the printing characteristics during printing can be prevented.

Figure 27:
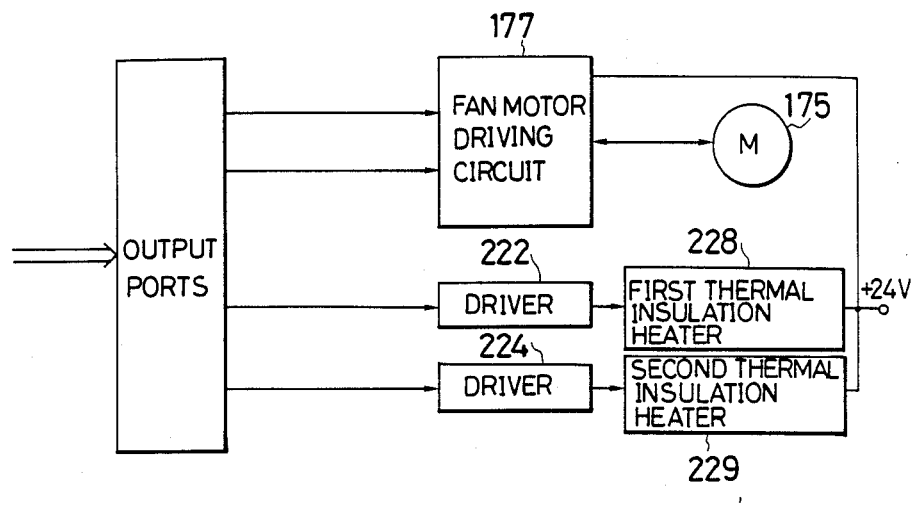
FIG. 27 and FIG. 28 are block diagrams which show the configuration of the driving circuit for the fan motor.

FIG. 27 is a detailed diagram of the driving circuit 177 in FIG. 23. In FIG. 27, 175 is a fan mmotor, 177 is a driving circuit for the fan motor, 228 and 229 are thermal insulation heaters for warming ink, and 222 and 224 are drivers for the thermal insulation heaters 228 and 229 respectively.

[Fan Motor Driving Circuit]

Figure 28:
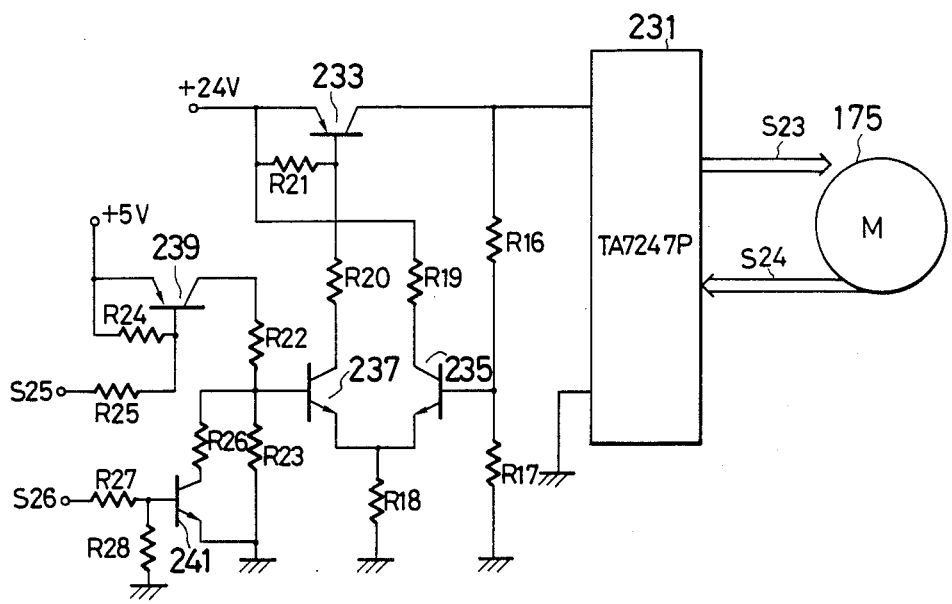

FIG. 28 is a detailed diagram of the fan motor driving circuit shown in FIG. 27. In FIG. 28, S23 is a driving differential signal line of the motor, S24 is a position detection signal line of the motor, 231 is an IC for motor driving (TA7247P made by Toshiba Corp.), 233 is a voltage control transistor for creating a supply power source for IC231 for motor driving, and 235 and 237 are transistors for a differential amplifier.

To the base of the transistor 235 there is applied a voltage which is obtained by dividing the voltage to be applied to the IC231 for motor driving, with resistors R16 and R17. In addition, to the base of the transistor 23, there is impressed a voltage obtained by voltage dividing the collector output voltage of the transistor 239 with resistors R22 and R23, when the transistor 239 is in on-state, namely, when the driving signal S25 of the motor 175 is on LOW level. Further, to the same base is applied a voltage which is obtained by voltage dividing with parallel resistors R23 and R26, and a resistor R22, when the speed control transistor 241 is in an on-state.

The collector of the transistor 237 is connected via a transistor R20 to the base of the transistor 233 so that a voltage which is proportional to the base voltage of the transistor 237 is applied to the IC231 for motor driving. Therefore, when the velocity control signal S26 is varied in the LOW level state of the motor driving signal S25, the speed of rotation of the motor 175 is changed between two values.

[Speed Control Conditions of Fan Motor during Printing]

Figure 29:
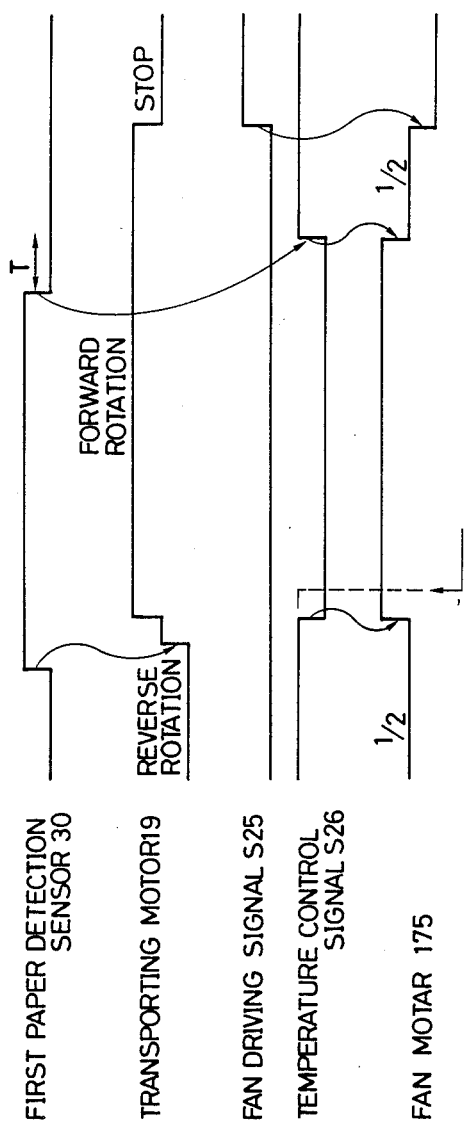
FIG. 29 is a time chart for explaining the operation of the fan motor driving circuit.

In FIG. 29, a recording paper 7 is taken out from the paper feeding unit by rotating the motor for transportation 19 in a reverse direction. The recording paper 7 supplied is detected by the first paper detection sensor 30 placed in front of the resist roller 33. Then, the motor for transportation 19 is halted temporarily and is actuated again. The motor 19 is controlled then to be rotated in a forward direction so that the resist roller 33 is rotated and the paper 7 is sent out toward the head unit 35. Further, the speed control signal S26 is changed from "H" to "L", the fan motor 175 achieves a rotational speed which is one half of a fixed speed, and after elapse of a predetermined duration T from the state of full fixed speed, the speed control signal S26 is switched from "L" to "H". Therefore, the speed of the fan motor 175 becomes one half of the fixed speed again. Then, the paper 7 is ejected, and upon completion of a series of printing operations, the fan motor 175 is brought to a stop by the switching of the fan driving signal S25 from "L" to "H".

By the above control, the paper 7 can be moved attached closely to the sticking belt, by changing the speed of the fan motor 175 from one half of the fixed speed to the full fixed speed, immediately before the front edge reaches the position above the thermal head 35. Therefore, even if there are curls on the front and rear ends of the paper 7, a stable printing can be realized without generating rubbing of the thermal head 35 with the heating elements 5.

[Configuration and Operation of the Printing Data Control Circuit]

Figure 30:
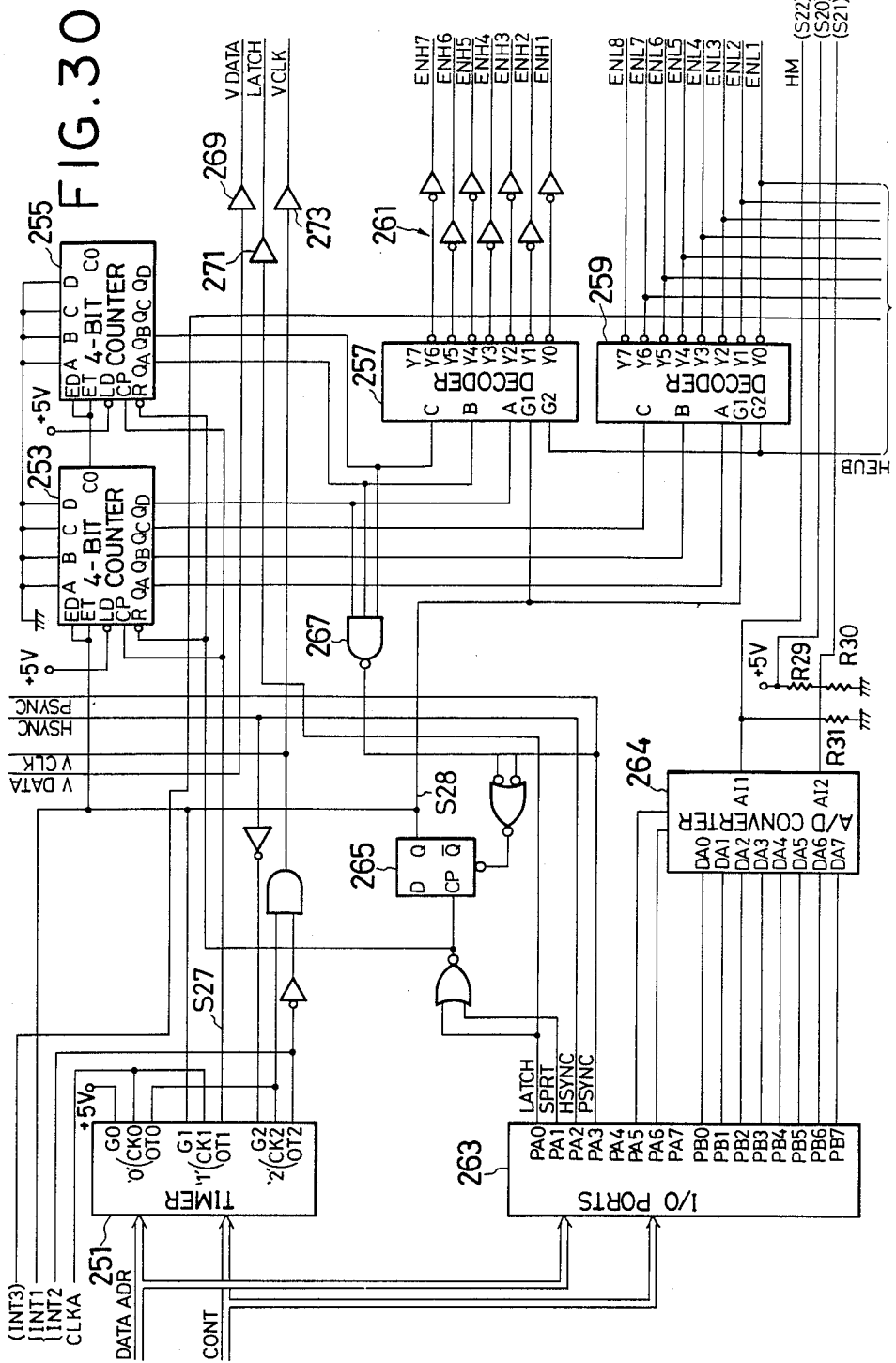
FIG. 30 is a block diagram which shows the configuration of the printing data control circuit.

In FIG. 30, the timer 251 is a timer (825 made by Intel Co.) which has three built-in timer circuits. Timer "0" of the timer is used for generating video clocks (corresponding to the transfer of one picture element) VCLK during printing operation. Timer "1" is used to obtain fundamental driving pulses ENL1 to ENL8 during time division driving of the thermal head. Timer "2" is used for controlling the send out number of one line of the video clocks VCLK. The 4-bit counters 253 and 255 are counters (corresponding to LS117 of Texas Instruments) which count the driving fundamental pulses S27, and generate time division driving control signals ENL1 to ENL8 and ENH1 to ENH7.

Decoders 257 and 259 decode outputs of the counters 253 and 255, and send out the time division driving control signals ENL1 to ENL8 and ENH1 to ENH7 to the thermal head 35 via inverters 261 that are provided separately. In addition, the outputs are sent out also to the thermal head protection check circuit 262 where a check on the pulse width is carried out. When an abnormality is detected as a result of the pulse width check, head enable signal HENB becomes "L" level and the outputs of the decoders 257 and 259 both become "H" level, so that the driving of the thermal head 35 is brought to a stop instantly.

The port output PA0 of the input-output port 263 is a signal LATCH output for latching the data that are sent out serially to the output latch in the thermal head port output PA1 is a trigger signal SPRT output for driving the time division driving signal which is done in reprinting one line twice in order to enhance the printing density port output PA2 is the horizontally synchronized signal (line synchronization signal) HSYNC in printing one line port output PA3 is the page synchronization signal PSYNC for one sheet of paper.

Flip-flop 265 controls the output enable in the case of printing one line, wich is operated so as to output an enable signal once in the case of single printing, and for twice in the case of double printing. The flip-flop 265 is set by the LATCH signal and the trigger signal SPRT, and is reset when the counters 251 and 253 are counted up and the inputs of the gate 267 all become a "1".

To the thermal head 35, time division driving control signals ENL1 to ENL8 and ENH1 to ENH8, video clock signal VCLK, output latch signal LATCH, and video data signal VDATA are sent via output buffers 269, 271, and 273.

In addition, to the interface circuit 193, there are sent the page synchronization signal PSYNC, line synchronization signal HSYNC, and video clock signal VCLK from the interface circuit 193, there is sent out a video data VDATA synchronized with the video clock signal VCLK by the printer interface 127.

Figure 31:
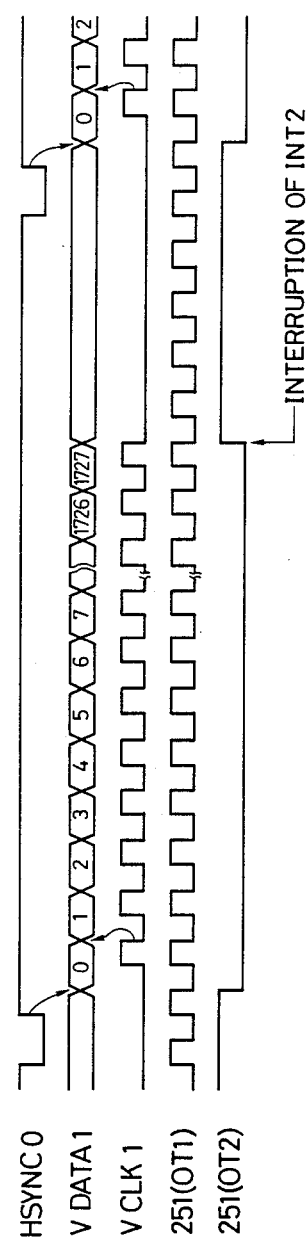
FIG. 31 and FIG. 32 are time charts which show the relationship between various kinds of signals of the printing data control circuit.

FIG. 31 shows the relationship among the line synchronization signal HSYNC, video data signal VDATA, and the output signals of OT1 and OT2 of the timer 212, of FIG. 30.

Figure 32:
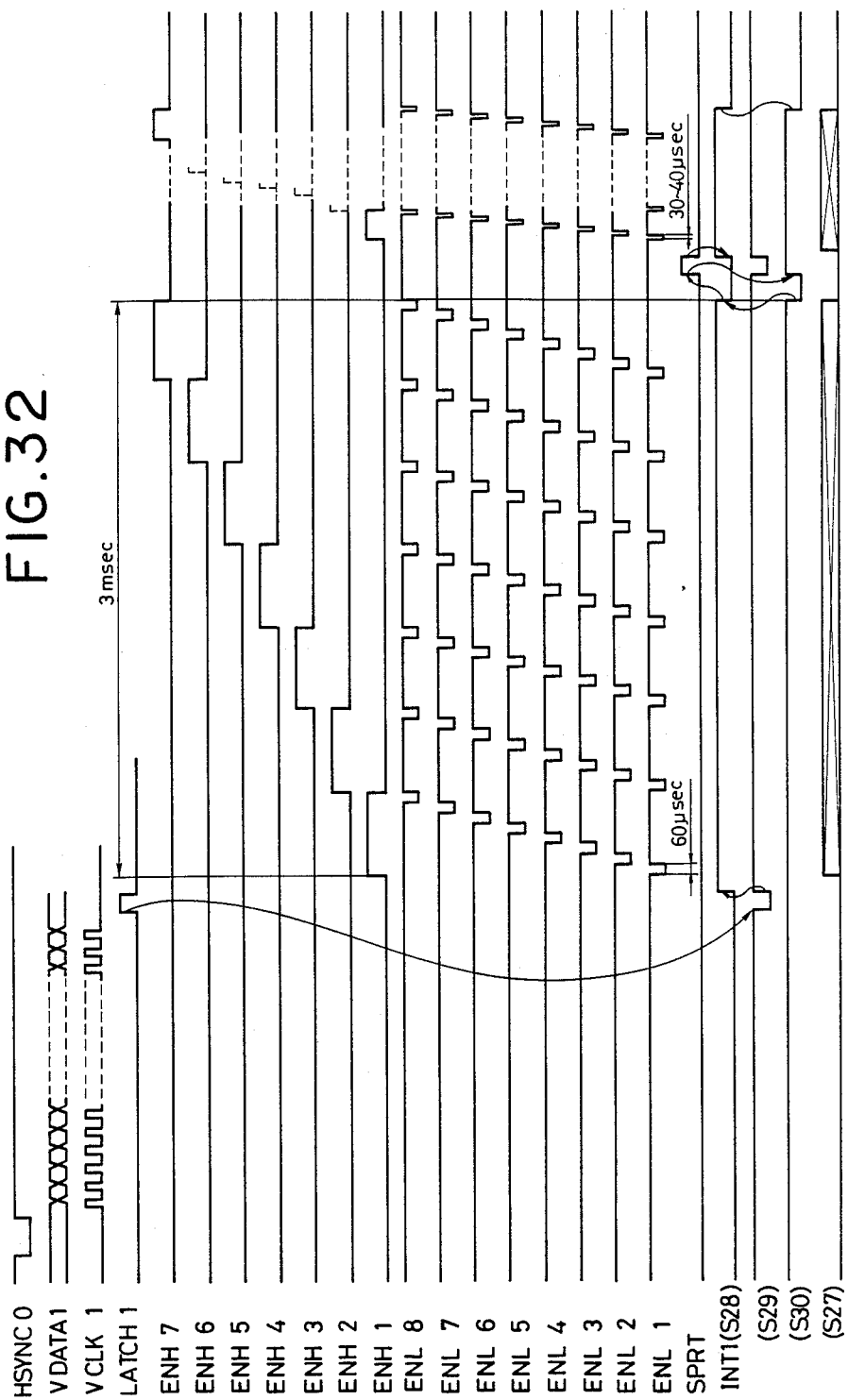

FIG. 32 is a timing chart that shows the relationship among the line synchronization signal HSYNC, video data signal VDATA, video clock signal VCLK, latch signal LATCH, time division driving control signals ENL1 to ENL8 and ENH1 to ENH7, double printing control signal (trigger signal) SPRT, output INT1 (S28) of output enable control flip-flop 265, and so on of FIG. 30. It shows the operational timings for the case of printing twice for one line (double printing).

When single printing is designated from the printer interface 127, trigger signal SPRT is not output so that the head 35 is driven only once. Further, the output S28 of the FF265 for output control enable, and the output of the timer 251 (OT2) for controlling the sending number of one line are connected to the interruption control circuit 197. The flip-flop 265 is used for controlling the double printing. Namely, when the first printing is completed, the flip-flop 265 is reset. By the change in the output, the microprocessor 171 is interrupted, and the microprocessor 171 outputs a trigger signal SPRT which is the signal for starting a second printing drive, on the output port 213 (PA1).

The timer 251 is used for controlling the time division driving of the head 35 after the latching operation. Namely, the microprocessor 171 is interrupted by the change in the output of the timer 251 (OT2), and the microprocessor outputs a latch pulse LATCH to the output port 263. Thereafter, driving operation of the head by time division will take place.

[Thermal Head Protection Check Circuit 262]

Figure 33:
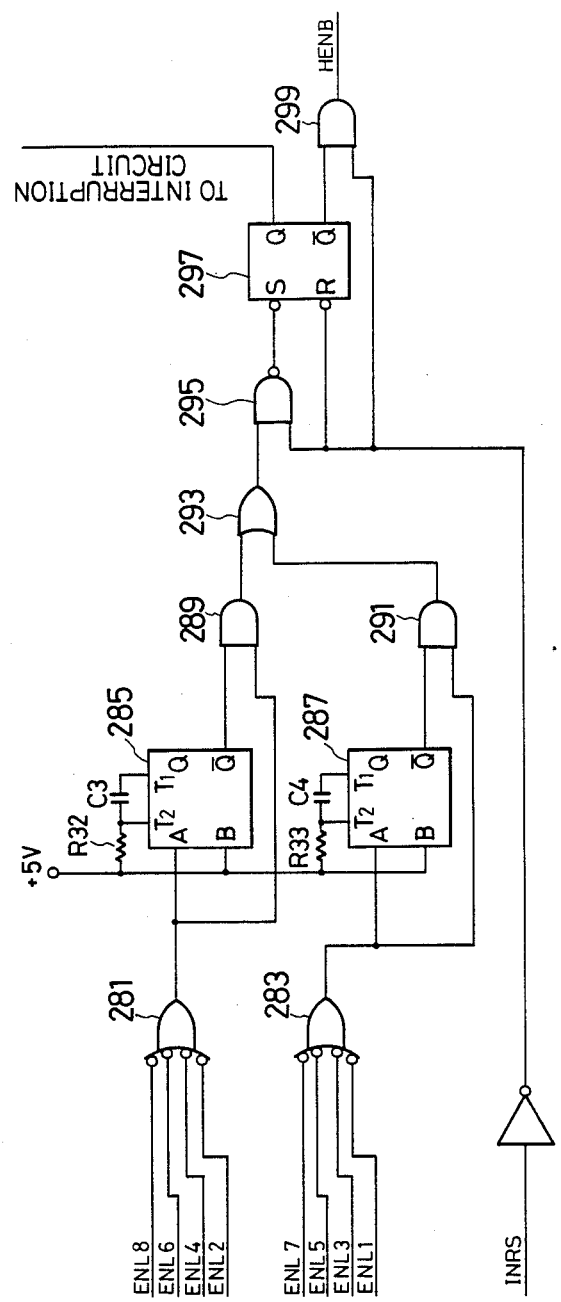
FIG. 33 is a block diagram which shows the configuration of the protection check circuit for the thermal head.

FIG. 33 shows the thermal head protection check circuit 262. This check circuit 262 is a circuit which checks the width of the applied pulse during time division drive. During time division drive, if the width of the pulse applied to the thermal head 35 is greater than a prescribed value, the temperature of the heating elements 5 of the thermal head 35 is raised abnormally high which will bring about degradation and burning damage to the heating elements.

Each input of the 4-NOR gates 281 and 283 is connected to each of the drive pulses ENL1 to ENL8 that are given to the thermal head 35 during time division drive. The way in which they are connected is such that the even numbered drive pulses, ENL 2, 4, 6 and 8 are connected to the gate 281, and the odd numbered drive pulses, ENL 1, 3, 5, and 7, are connected to the gate 283. The mono-multivibrators 285 and 287 are respectively triggered by the output signals of the gates 281 and 283.

The capacitors $C_3$ and $C_4$ and the resistors R32 and R33 are for setting the pulse widths of the mono-multivibrators 285 and 287. In the present embodiment, they are set to give 90 usec for both of the mono-multivibrators 285 and 287.

The input terminals of the AND gates 289 and 291 are connected to the output of the mono-multivibrators 285 and 287 and the 4-NOR gates 281 and 283. Consequently, the outputs of the AND gates 289 and 291 do not satisfy the AND conditions when they are operating normally, that is, when the width of the applied pulse is 60 usec. Only when the applied pulse width (of ENL1 to ENL8) exceeds 90 usec, due to such causes as circuit failure or malfunctions of the microprocessor 171, the the AND conditions are satisfied and their outputs become "1". Accordingly, due to connection of the outputs of the AND gates 289 and 291 to a 2-OR gate 293, an R-S flip-flop 297 will be reset through a gate 295.

When the R-S flip-flop 297 is set, an interruption request is given to an interruption circuit 197, and the printing operation is brought to a stop. At the same time, head enable signal HENB is brought to "L" level through an AND gate 299. Then, by the change to "L" level of the input terminal G2 of the decoders 257 and 259, the drive of the heating elements of the thermal head 35 is brought to a stop instantaneously.

With such check operations provided, damages to the heating elements on the thermal head 35 can be prevented for all kinds of abnormal operations.

In addition, INRS in FIG. 33 is an initial reset signal at the time of connecting and disconnecting the power supply, which is supplied by the power supply unit 191. Since the initial reset signal is given to the reset terminal of the R-S FF 297 and the AND gate 299, and becomes "L" level without fail, unstable operations, namely, careless drive of the thermal head 35, can be prevented.

Figure 34:
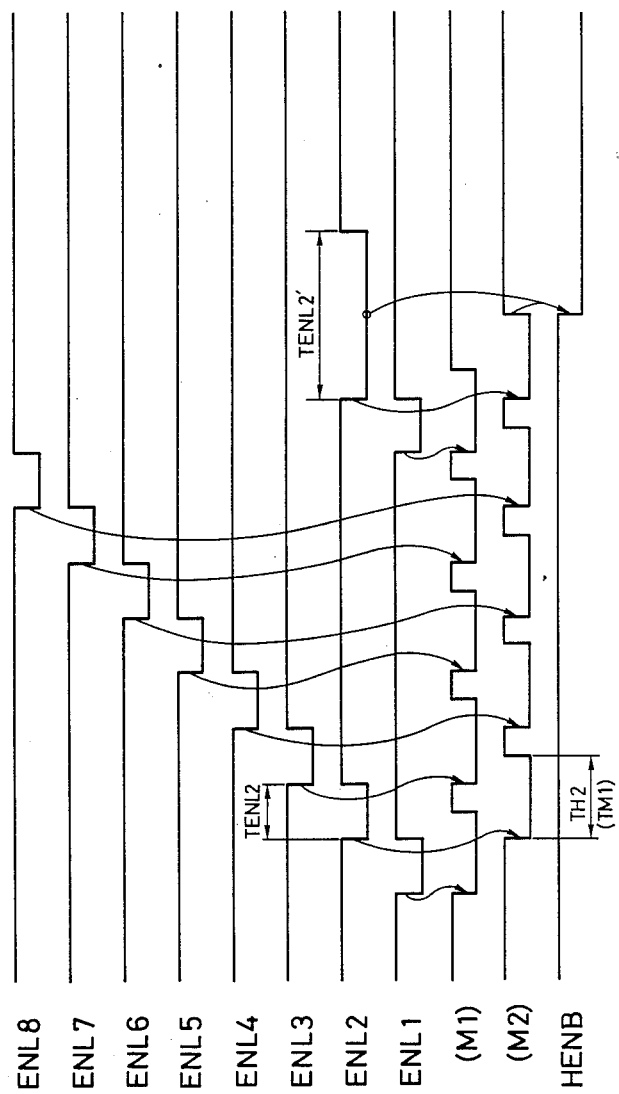
FIG. 34 is a time chart for explaining the operation of the thermal head protection check circuit.

FIG. 34 shows operational timings of the present head protection check circuit 262.

The figure shows a timing chart in which the head drive signals ENL1 to ENL8 are input normally for the first time but the ENL2 signal became longer than the prescribed pulse 2 for the second time due to some kind of inconvenience.

Figure 35:
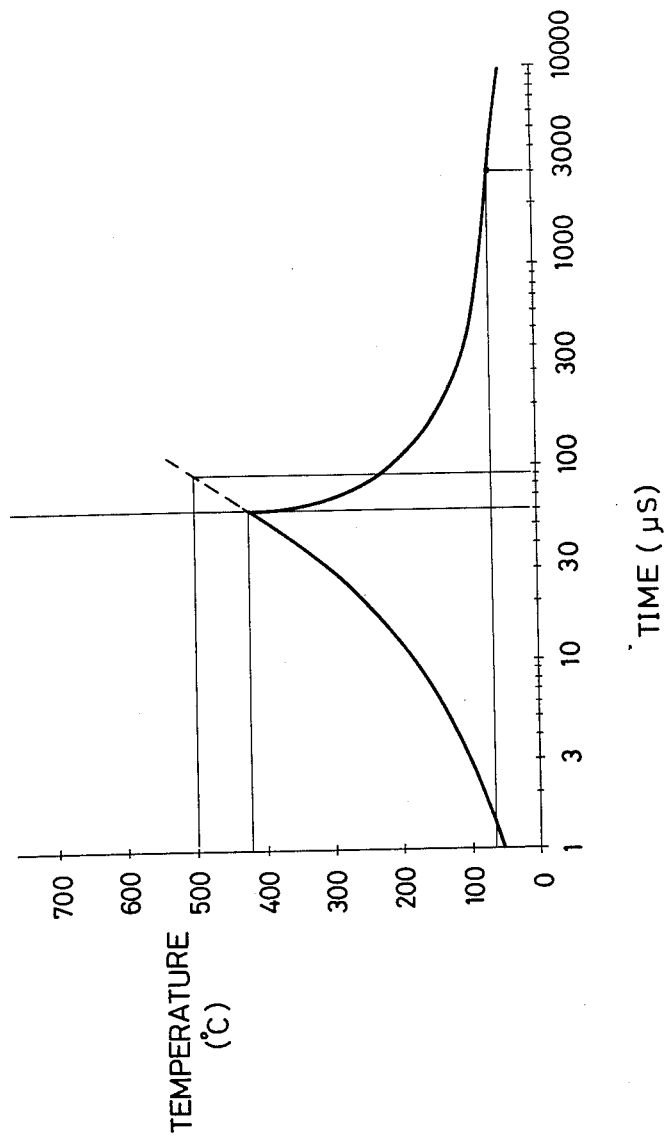
FIG. 35 is a characteristic diagram which shows the relationship between the width of the applied pulse and the temperature of the heating elements during thermal head drive.

FIG. 35 is a graph which shows the relationship between the width of the applied pulse and the temperature of the heating elements 5 during head driving. As may be seen from the figure, the temperature of the heating elements 5 for the ordinary width of applied pulse of 60 usec is about 420° C. In the present check circuit 262, the check pulse width is prescribed to 90 usec, so that the temperature of the heating elements is controlled to a maximum of about 500° C. and can prevent damage to the head.

[Configuration and Operation of the Interface Circuit 193]

Figure 36:
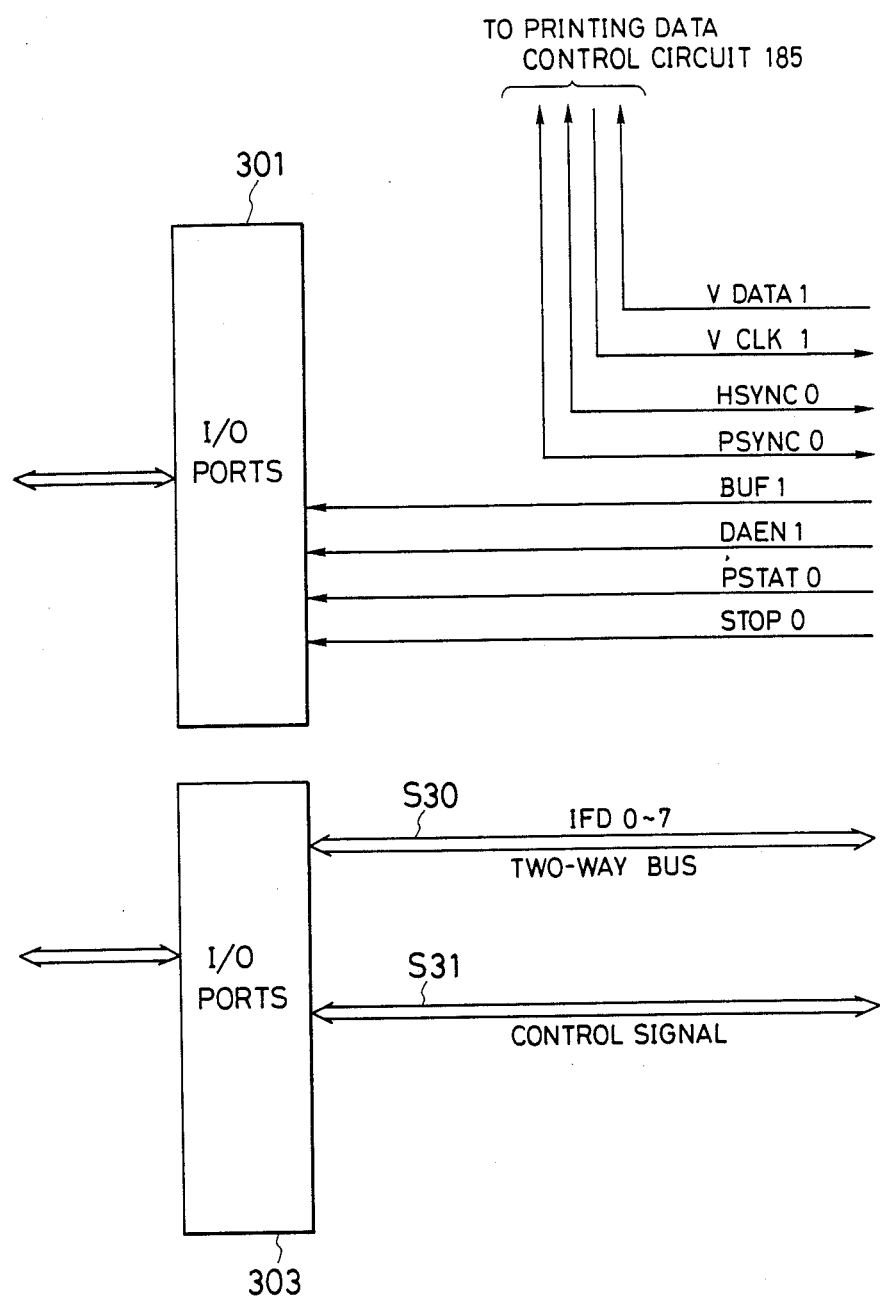
FIG. 36 is a block diagram which shows the configuration of the interface circuit.

FIG. 36 shows details of the interface circuit 193 in FIG. 22. The interface circuit 193 is a circuit for exchanging the printing data, control command/status data, and so forth between the printer interface 127.

In FIG. 36, 301 is an input-output port for transferring signals used for transfer control of the printing data, and 303 is a port for transferring mainly the command/status data. In addition, four signals, namely, the video data signal VDATA1, video clock signal VCLK1, line synchronization signal HSYNC0, and page synchronization signal PSYNC0, are connected to the printing data control circuit 185. BUF1 is a signal which is used in transferring the printing data from the printer interface unit 127. When this signal is "1", it signifies that preparation is complete for the transfer of the printing data block. DAEN1 indicates that the data which is now being sent out is effective data (data that is to be printed on the recording paper). PSTAT0 is a start for one page of printing, and STOP0 signal is used for temporarily halting the printing operation from the printer interface 127. IFD0 to IFD7 (S30) are two-way balances for command and status data and S31 is a control signal line for data strobe, busy signal, and others.

[Configuration of Power Supply Unit]

Figure 37:
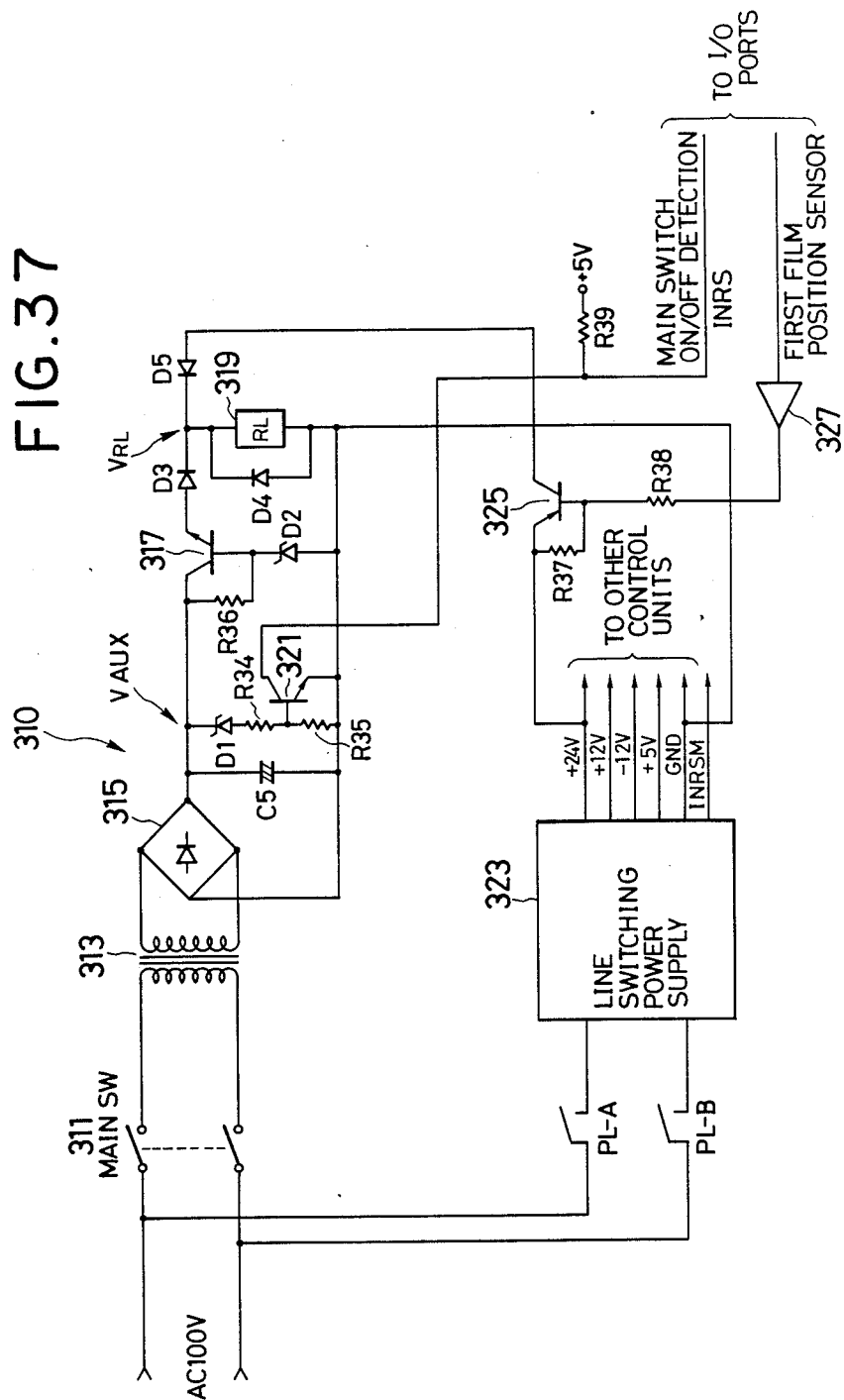
FIG. 37 is a diagram which shows the configuration of the power supply unit.

FIG. 37 shows the power supply unit 191. The power supply unit 191 includes an auxiliary power supply 310 and a main power supply (line switching power supply) 323.

On the high voltage side of a step-down transformer 31 of the auxiliary power supply 310 is connected via a main switch 311 to the commercial power supply (AC 100 V), and on the low voltage side, AC voltage that is stepped down, rectified and smoothed via a diode bridge 315 and a capacitor C5.

The smoothed DC voltage, that is, the auxiliary supply voltage Vaux, is kept at 24 V by a transistor for regulator 317 and a Zener diode D2 of 24 V. Further, a voltage drop in the auxiliary supply voltage Vaux is sensed by a diode D1 and ON/OFF of the auxiliary power supply 310 is sensed by a transistor 321.

The auxiliary supply voltage Vaux of 24 V is applied to a power relay 319 which controls the ON/OFF of the main power supply 323 as will be described later. Further, diode D3 is a diode for preventing the mixing of current in the auxiliary power supply 310 during supply of 24 V by the main power supply 323, diode D4 is a diode for killing the sparks in the power relay 319, and diode D5 is a diode for preventing the mixing of current from the auxiliary power supply 310 to the main power supply 323.

To a line switching power supply 323 which becomes the main supply, there is input the commercial supply voltage via make contact RL-A and RL-B of the power relay 319 from the power supply 323 there are output voltages +24 V, +12 V, −12 V, and +15 V and main initial signal INRSM, which becomes the initialization signal for the microprocessor 171 and various kinds of control circuits.

The output voltage is supplied to the power relay 315 via a transistor 325 which controls ON/OFF of the power relay 319. In addition, the ON/OFF of the transistor 325 is controlled by the film position detection signal from the first film position detection sensor which is supplied via a drive buffer 327.

[Operation of the Power Supply Unit]

Figure 38:
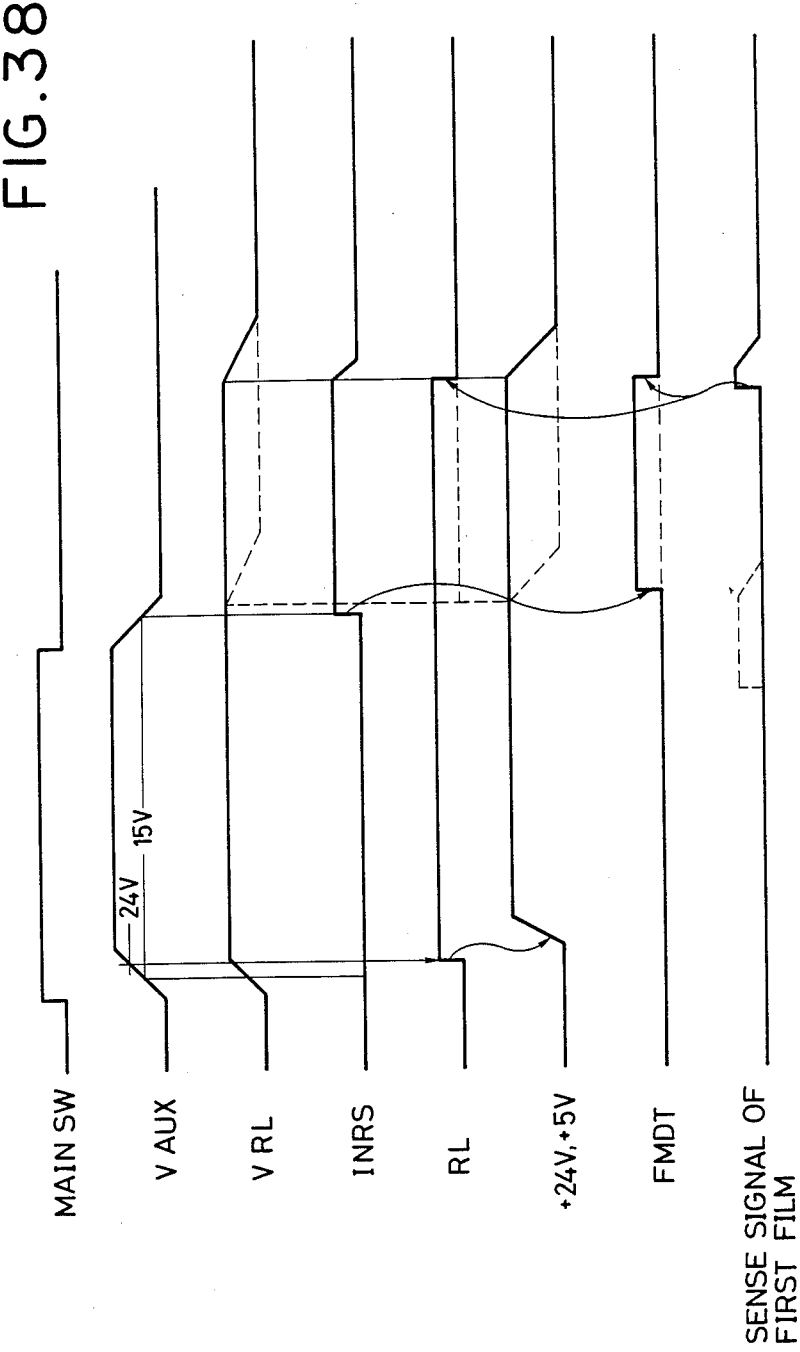
FIG. 38 is a time chart for explaining the operation of the power supply unit.

FIG. 38 shows a timing chart for the ON/OFF power supply of the power supply unit 191.

When the main switch 311 is closed, the auxiliary 310 is turned on. When the auxiliary supply voltage Vaux and the impressed voltage VRL to the power relay 319 become about 24 V, the relay 319 is actuated and the relay contacts RL-A and RL-B are closed. In this way, the 110 VAC commercial supply voltage is applied to the main power supply 323 and the operation is started.

From the main power supply 323, the various voltages are output and also the main initial signal INRSM is output for a predetermined length of time. By the signal INRSM, the microprocessor 171 and other control circuits are initialized.

When the main switch is opened, the auxiliary supply voltage Vaux decreases and when it becomes about 15 V, the Zener diode D2 ceases to operate and the transistor 321 becomes off-state. With this, the initial reset signal INRS changes from "L" to "H" (+5 V), and the closure of the main switch 311 is sensed by the microprocessor 171.

Here, voltage is applied to the relay 319 from both of the auxiliary power supply and the main power supply by diodes D3 and D5, so that the relay will not be turned off even if the main switch is opened, and the main power sources 323 continues to operate.

When the microprocessor 171 detects the disconnection of the auxiliary power supply, it performs the following control operations.

(i) When the film 1 is at the stopping position in the standby condition

When the opening of the main switch 311 is detected by the interruption of the initial reset signal INRS, the microprocessor 171 checks the state of the first film sensor 63.

Since the film 1 is at the stopping position (then the film cartridge is in a tightly sealed state), output of the sensor 63 is in an on-state. Accordingly, the microprocessor 171 does not carry out any control operation, the power relay 319 is turned off, and the main power supply 323 is disconnected.

(ii) When the film 1 is at a position other than the stopping position in the standby condition:

Since the film 1 is at a nonstopping position (the film cartridge is in a state which is not tightly closed), the output of the sensor 63 is in an off-state. Consequently, the microprocessor 171 actuates the film drive motor 47 to transport the film 1. When the film position hole is detected by the first film sensor 63, the film drive motor 47 is brought to a stop. With this, the multi-orifice portion 3 of the film 1 is housed within the film cartridge and the cartridge is tightly closed. Then, the output of the buffer 327 becomes "H" level (open), the transistor 325 is turned off, the power relay 319 is turned off, and the main power supply 323 is disconnected.

(iii) During Printing:

By an interruption command from the power supply unit 191, the microprocessor 171 detects the opening of the main switch 311. However, the printing operation is not brought to a stop since it is in the state of printing. In other words, the printing operation will continue when an interruption command is delivered and the operation in (ii) above will be taken up at the point in time when the printing operation for one page is completed. The microprocessor 171 actuates the film drive motor 47 to transport the film 1 upon completion of printing. When the film position holes 75 and 85 are detected, the film drive motor 47 is brought to a stop, and the film cartridge is closed tightly. Only at that point is the main power supply 323 disconnected.

As described in the above, according to the power supply unit 191, when the main switch 311 is opened, the multi-orifice portion 3 of the film 1 is housed in the film cartridge, and the film 1 is brought to a stop in the state of tight closure of the film cartridge. Therefore, drying of the ink-filled film 1 and evaporation of ink from the cartridge can be prevented without fail.

Accordingly, even if the main switch 311 is opened unwittingly during printing, the main power supply 323 is disconnected after completion of one sheet of the recording paper 7, and the film cartridge is closed tightly. Therefore, printing can be accomplished surely, and misprints and ink evaporation can be prevented.

Moreover, the state of tight closure of the film cartridge can be released only by the signal for starting print which comes from the print control unit so that the state of completely tight closure can be retained, and blinding of the film 1 due to drying of ink and evaporation of ink from the cartridge can be prevented.

[Memory Map of the Print Control Unit 129]

Figure 39:
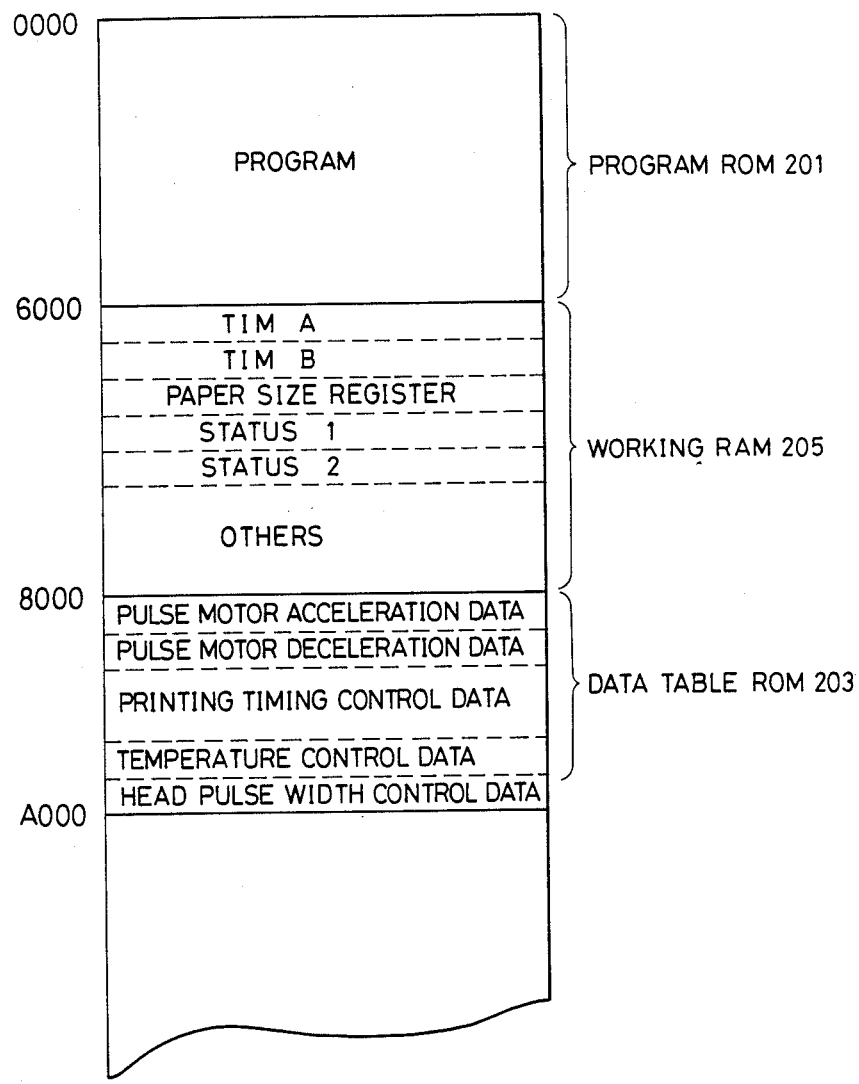
FIG. 39 is a diagram which shows the memory map within the print control unit.

FIG. 39 is a memory map which shows the areas of usage of memories in the print control unit 129.

The addresses from "0000" to "5FFF" are the control program area for controlling the print control area as a whole, and comprises ROM 201.

The addresses from "6000" to "7FFF" are the area of working RAM 205. They include timers TIMA and TIMB (These timers carry out time control with a relatively long period of order of 5 ms, by causing one of the timers among the timers 199 of FIG. 22 to interrupt with a predetermined period, and by counting the timer registers TIMA and TIMB for each of the interruptions), a paper size register which holds the contents of the cassette size discrimination switch 17, status registers 1 and 2 that memorize the state of the print control unit at that point in time, and so forth.

The addresses from "8000" to "9FFF" are the area of data table ROM 203. In addition to memorizing the acceleration and deceleration timer data of the paper forwarding motor 19, they include data for controlling printing timing, data for timing of paper transportation, temperature comparison control data for comparing the A/D converted data from thermistors, data to control the temperature of the cartridge, and so on.

FIG. 40 shows various kinds of commands that are sent out from the printer interface 127.

Status demand commands "SR1" and "SR2" are for sending out status data on the bus when the status of the print control unit is read, which are sent out before and after printing of one page to monitor the state of the print control unit 129.

Select lamp lighting command "SELON" is for lighting the select lamp in the display control unit 173, and select lamp putting-out command "SELOFF" is for putting the lamp out.

Data designation command "PSEL" is a command for designating the data that is sent out from the printer interface 127. By this command, the state of image and character is switched every time when a command is sent out.

Image density selection command "IDSEL" is a command for selecting the image density of printing, and every time when this command is sent out, density designation is switched between the states of high and low. When the density is "high", the double printing operation takes place and when it is "low", single printing takes place.

FIG. 41 shows the status of the print control unit 129. In the figure, the 8-bit status in the upper row is sent out to the bus by means of the status demand command "SR1" and the items int he lower row are sent out by "SR2".

Of the status that can be called by means of the status demand command "SR1", "SELECT SWON" becomes "1" when the select switch in the control display unit 173 is turned on. This status becomes "0" upon receipt of the command "SELON" or "SELOFF". "READY" becomes "1" when the printer interface 127 is ready to print. The density changes in the order of density "1" (high) and density "0" (low) by receiving the "IDSEL" command. "IMAGE" changes in the order of image "1" and character "0" on receipt of the "PSEL" command. "CASSETTE SIZE" displays the size of the currently mounted cassette in combinations of three bits.

Next, the status by means of the command "SR2" is one that is used when the "READY" in the above is in the state of "0", and "NO PAPER" becomes "1" when there is no paper in the cassette.

"PAPER JAM" becomes "1" when the paper is jammed while it is on the printer transporting route. "COVER OPEN" becomes "1" by a microswitch (not shown) which is activated by the opening and closing operation of the transportation mechanism in the upper recording unit shown in FIG. 2. "NO INK" becomes "1" when there remains no ink in the ink bottle.

[Data Transfer between Printer Interface 127 and Print Control Unit 129 and Drive Control of Each Pulse Motor in Print Control Unit, during Character Printing]

The operation will be described by making reference to the timing chart shown in FIG. 42.

Upon receipt of a printing data from the host-side system, the printer interface 127 examines the state of the print control unit 129 by sending out a status command (SR1 or SR2) corresponding to the printing conditions. After judging that the print control unit 129 is ready to print as a result, it sets printing conditions by sending out a command which designates the printing conditions, to the print control unit. Then, it shifts the print start signal PSTAT1 to "H" level.

Upon receipt of the print start signal PSTAT1, the print control unit 129 causes the feed roller 13 to rotate by rotating the paper forwarding motor 19 in the reverse direction to take out a sheet of printing paper 7 from the cassette 9. The paper taken out is further transported toward the resist roller 33 by the feed roller 29. The tip of the paper transported is detected by the first paper detection sensor 30. The detected signal is supplied to the microprocessor 171.

After discriminating the detected signal, the microprocessor 171 sets the timer 199. By this, the paper is transported for a fixed length of time. After the above paper feeding operation, the tip of the paper is put in good order by the resist roller 33.

In parallel with the paper feeding operation in the above, the film 1 is transported to the printable position by the film drive motor 47. Namely, the film setting operation is started by the left film position hole 75 or right film position hole 81 in FIG. 8. FIG. 42 illustrates the situation by assuming that the whole thing started from the state in which the point J2 in FIG. 8 was detected by the first film sensor 63.

When the microprocessor 171 receives a print start signal PSTAT 1, it sends out a pulse motor drive pulse in order to rotate the film drive motor 47 in the forward direction. In this case, by setting the timer 199 that controls the speed of rotation of the pulse motor to a timer value which corresponds to the fast mode, the film drive motor 47 is rotated in the positive direction with the speed of rotation of "1" (high speed).

Here, the film send-out counter provided in the working RAM 205 in FIG. 22 counts up "1" every time when one pulse motor driving pulse is sent out. Consequently, the pulse motor driving pulse is sent out until the counted value coincides with the pulse number NA up to the point J4, which is stored in the ROM 203 (data table). When the counted value reaches NA, the film drive motor 47 is brought to a stop when the multi-orifice portion 3 of the film 1 finds itself situated above the thermal head 35.

When the paper feeding operation for the recording paper 7 in the above is completed, a page synchronization signal PSYNC0 is sent out to the printer interface. Upon receipt of the signal, the printer interface 127 shifts the print stop signal STOP0 to "H" level and permits the sending of a horizontally synchronized signal HSYNC0.

The print control unit 129 causes the paper forwarding motor (PFM) 19 to rotate in the forward direction in order to forward the paper 7 which is held at the resist roller 33 to the thermal head 35. Starting with the time when the tip of the paper 7 reaches the position above the thermal head 35, the horizontally synchronized signals HSYNC0 are sent to the printer interface 127. The horizontally synchronized signal HSYNC0 is sent out for a duration that corresponds to the length of the recording paper 7. In addition, corresponding to the sending of the horizontally synchronized signal HSYNC0, the film drive motor (IRM) 47 is driven, and the film 1 is transported at a speed which is one half of the paper forwarding speed. In other words, drive pulses are sent to the microprocessor 171 at the rate of one for every two horizontally synchronized signals HSYNC0.

When the horizontally synchronized signal HSYNC0 is sent out corresponding to the length of the paper 7, the film 1 is further transported in the F direction in the high speed mode. By the detection of the film position hole 81 at the point J7 in FIG. 8 by the first film sensor 63, the drive of the film drive motor 47 is brought to a stop. In this state, the multi-orifice portion 3 of the film is housed in the film cartridge 43 so that the film cartridge 43 is in a state which is tightly shut out from the outside. Further, the stoppage of driving of the paper forwarding motor 19 takes place at the point in time when the rear end of the recorded paper 7 passes by the position above the second paper detection sensor 32 that is provided in the paper ejection unit. When the paper ejection is completed, the page synchronization signal PSYNC0 is changed to "H" level, and the system enters the standby state which is ready to accept the start of the next printing.

When a next printing start signal PSTAT1 is received in this state, since the film 1 is stopped in the state in which the point J7 in FIG. 8 is detected, the print control unit 129 transports the film in the E direction, and gives pulses that correspond to the value NB to the film drive motor 47 until the film arrives at the point J6 which is the point for starting printing.

Moreover, while the film 1 is in transportation, signals from the film motion detection holes shown in FIG. 23 are checked. Namely, on the opposite side with respect to the multi-orifice portion 3 of the first portion detection hole 75 on the left side, and the second position detection hole 79 on right side, there are provided the motion detection holes 82 that are provided a predetermined distance apart. These motion detection holes 82 carry out detection of an undetected hole portion of the motion detection hole unit, using a film motion detection sensor 66 which is operated by the same principle as the first film position detection sensor 63. As shown in FIG. 23, signals from the film motion detection sensor 66 are read through the input port by the microprocessor. The spacing of the motion detection holes in this embodiment is given a pitch which corresponds to the length of four pulses that are applied to the film drive motor 47. Accordingly, when the signal changes due to the film motion holes being detected during film transportation, the microprocessor 171 sets predetermined bits in the internal register.

Figure 55:
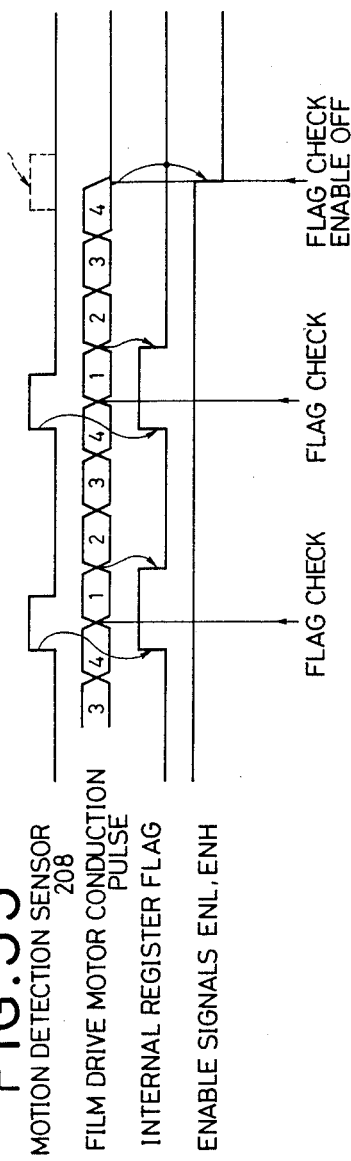
FIG. 55 is a detailed time chart for the printing operation shown in FIG. 42.

The bits in the above sequence are reset after outputting driving pulses to the film drive motor 47. Then, prior to outputting a fourth driving pulse, a judgment is formed whether or not the above-mentioned bits are actually set. If they are found set, the bits are reset after outputting of the drive pulse, and film transportation is continued. If they are not set, the drive of the heating elements is stopped at that point in time, and the printing operation is brought to an end (see the time chart shown in FIG. 55).

Figure 42:
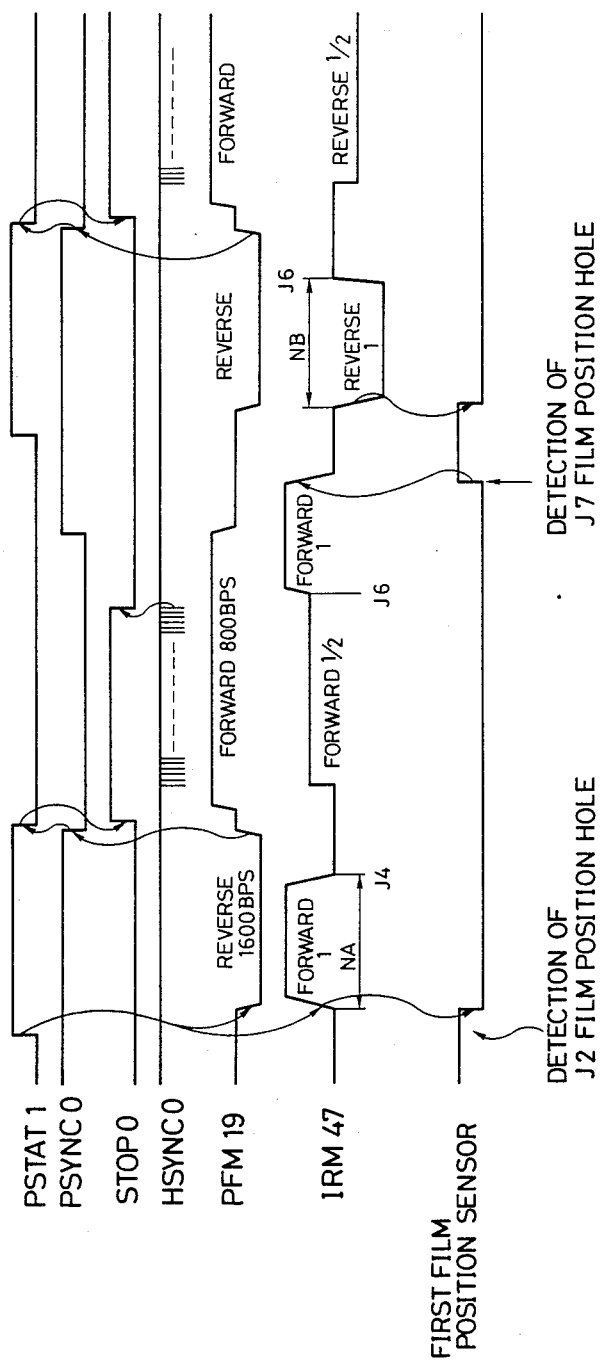
FIG. 42 to FIG. 44 are time charts at the time of letter data printing.
Figure 43:
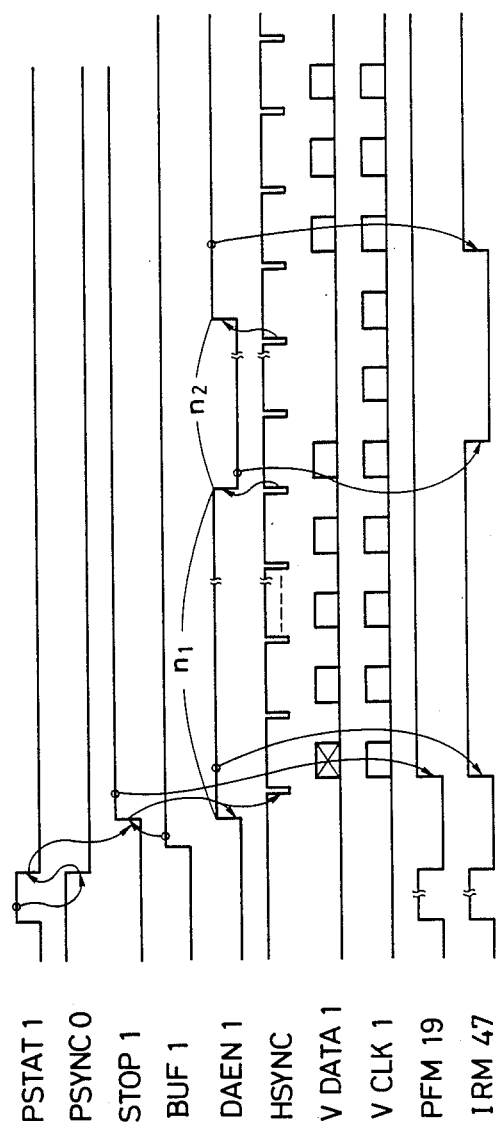
Figure 44:
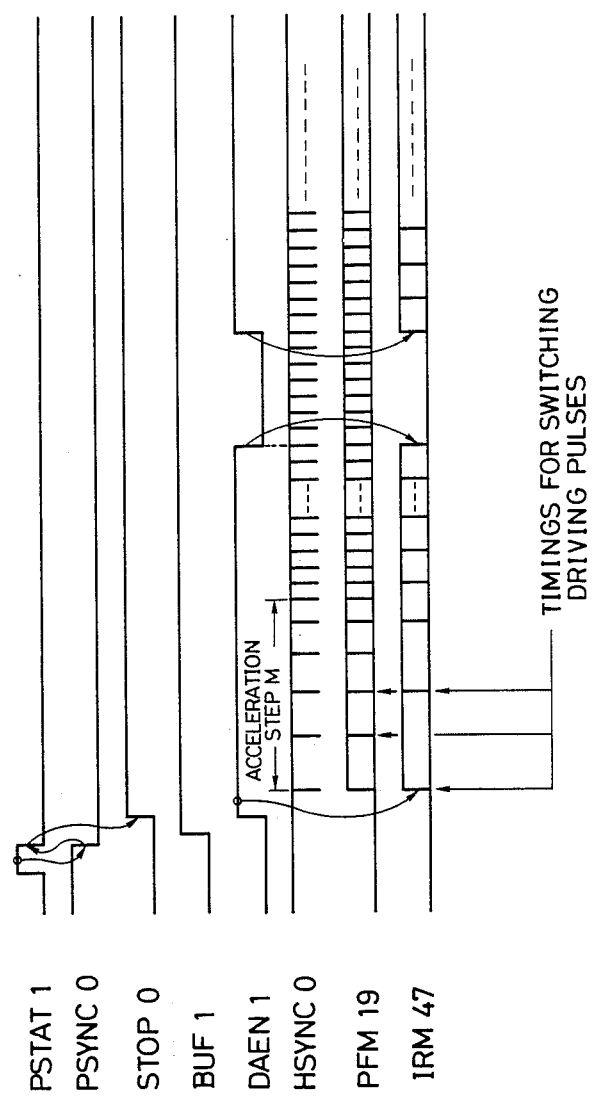

FIG. 43 and FIG. 44 are diagrams that show detailed timings during printing operation shown in FIG. 42.

In FIG. 43, if the page synchronization signal PSYNC0 on the printer interface 127 side becomes "L" level, the print start signal PSTAT1 becomes "L" level.

When the bit development to the image buffer RAMs 163 and 165 is completed, the BUF1 signal which shows the presence of a data that is sent out from the image buffers 163 and 165 becomes "H" level, and the stop signal STOP0 which brings the printing operation to a temporary stop becomes "H" level (that is, releases the stoppage). In addition, the DAEN1 signal which shows that the data sent out is the data to be actually printed, becomes "H" level. With this, the print control unit 129 sends out the horizontally synchronized signal HSYNC0, and sends out one line portion (1728 in number) of the synchronization clock VCLK1 of the printing data.

By the horizontally synchronized signal HSYNC0 and synchronization clock signal VCLK1, the printer interface 127 sends out the printing data in the image buffers 163 and 165 to the print control unit 129. FIG. 42 shows this aspect of character printing. A line unit is divided into effective lines n1 and space feeds n2, as shown in FIG. 21. Accordingly, the DAEN1 signal is controlled so as to have it on "H" level during the period in which n1 line synchronization signals HSYNC0 are sent out. In addition, during the time when the DAEN1 is on "L" level, that is, in the segments for space feeds, there takes place the simple operation of paper feeding, without carrying out printing, so that the driving of the film drive motor 47 is stopped. When the DAEN1 signal becomes "H" level, the driving of the film drive motor 47 is started.

By arranging to carry out the film transportation operation as above, it is possible to reduce the length of the multi-orifice portion 3 of the film 1.

FIG. 44 is an explanatory diagram about the timing for applying driving pulses to the paper forwarding motor 19 and to the film drive motor 47 during the operation shown in FIG. 43.

The driving pulses to the paper forwarding motor 19 is given in an accelerated manner as shown in the figure. This is done so because of the inertia that exists in the driving portion, to use the motor more efficiently, by shifting the speed of the motor at the start of the driving from a low speed to a high speed in succession.

Therefore, after completion of the acceleration segment shown in the figure, the paper forwarding motor 19 begins to rotate at a constant speed. The driving pulses for the film drive motor 47 are given synchronized with the driving pulses that are given to the paper forwarding motor 19. However, the film transporting speed is set at one half of the transporting speed of the paper so that the driving pulses for the film drive motor 47 are given at the rate of one for every two driving pulses of the paper forwarding motor 19. In addition, the horizontally synchronized signal HSYNC0 is supplied to the printer interface 127 synchronized with the driving pulse for the paper forwarding motor 19.

The control of the driving pulses to the drive motors 19 and 47 is carried out to realize an accelerated operation and a decelerated operation of the motors 19 and 47, by changing the data set to the timer 199 for each interruption demand. Further, in this example of operation, the data transfer to the image buffers 163 and 165 on the printer interface 127 side is carried out faster than the printing speed, so that both of the stop signal STOP0 and the BUF1 signal are in the "H" level state and the paper forwarding motor 19 is operated continuously without being halted.

Figure 56:
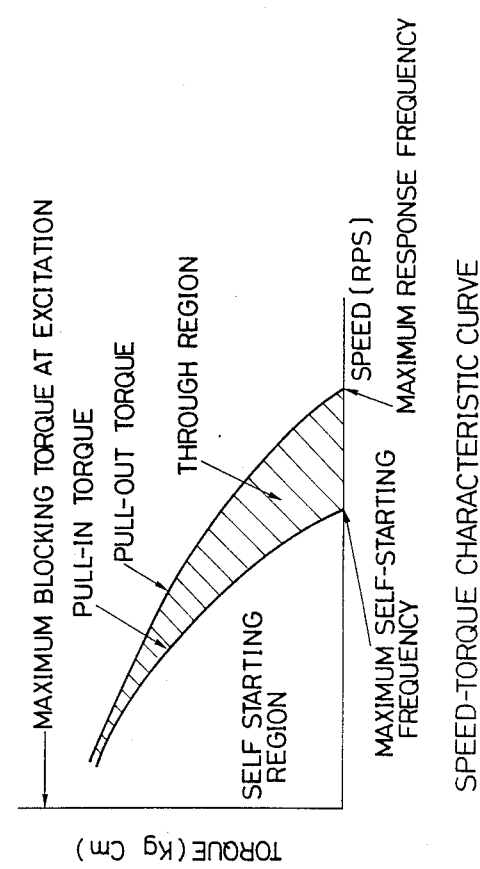
FIG. 56 is a diagram which shows the speed-torque characteristic of the pulse motor.

The film drive motor 47 is temporarily stopped, instantly, without any a deceleration,. This is possible because the film drive motor 47 has a smaller speed value (one half) and a smaller inertia than that of the paper forwarding motor 19, and is driven at a frequency in the self-starting region of the pulse motor (see FIG. 56).

Therefore, for a temporary stop stoppage of the film drive motor 47 when the paper forwarding motor 19 is operating continuously at a constant speed, no deceleration occurs.

As in the above, according to the present embodiment, the film 1 is transported synchronized with the transportation of the recording paper 7, and the ink supplied to heating elements 5 can be made constant, so that the printing density becomes uniform and stabilized printing can be accomplished.

In addition, driving pulses are applied to the film drive motor 47 at a rate of on driving pulse for an integral number of pulses that are supplied to the paper transporting motor 19. (In the present embodiment the ratio is one driving pulse for every two paper transporting pulses). Therefore, one can use the driving pulse control circuit and the software for the film drive motor 47 in common with those for the paper transporting motor 19, simplifying the circuit and the software for the entire system.

[Control in the Image Data Printing]

Figure 45:
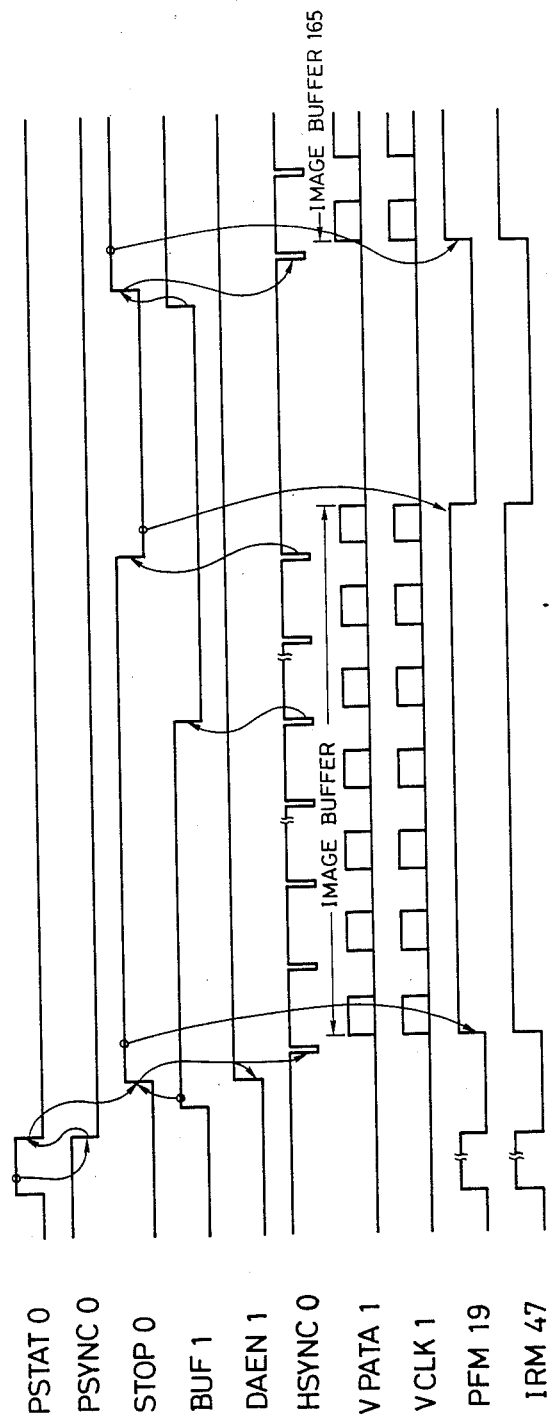
FIG. 45 and FIG. 46 are time charts in the case of image data printing.
Figure 46:
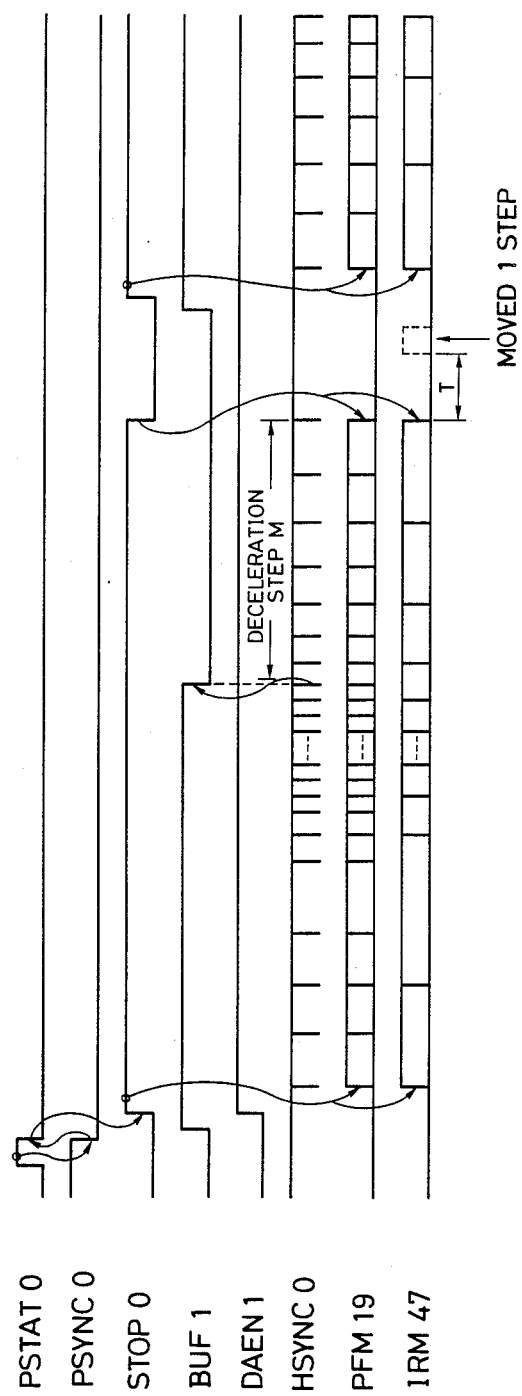

FIG. 45 and FIG. 46 show timing charts in printing an image data.

The paper transportation at the start of printing and the operation of the film drive motor are the same as in FIG. 43. The operation shown in FIG. 45 shows the case of printing an image data. Data are sent out from the image buffers 163 and 165 in FIG. 16 in the order of the image buffer 163 first and the image buffer 165 next. During the time when a first data is sent out from the image buffer 163, there takes place a data transfer from the host-side system 125 to the image buffer 165. In the figure, operational timings are illustrated for the case in which data transfer speed from the host-side system 125 is low such that it cannot catch up with the speed in the other side.

The DAEN1 signal that indicates the effectiveness of the printing is kept in "H" level state all times because the data involved is an image data. And, the STOP0 signal and the BUF1 signal are controlled as follows.

First, since the data transfer to the image buffer 165 is completed during the first sending of the data, the BUF1 signal is shifted to "L" level at a midpoint in the data transfer from the image buffer 163. At this point, on the print control unit 129 side, deceleration of the paper forwarding motor 19 begins. Accordingly, the paper forwarding motor 19 and the film drive motor 47 that is driven synchronized with the paper forwarding motor 19, are decelerated. Then, by a change to "L" level of the STOP0 signal from the printer interface 127, both drive motors 19 and 47 are brought to stop.

The printing of a second data block is started at the completion of the transfer of data from the host-side system 125 to the image buffer 165. Namely, by the completion of transfer of data to the image buffer 165, the BUF1 signal is changed to "H" level and the STOP0 signal is also changed to "H" level, which releases the temporary halt of the printing operation. The print control unit 129 drives the paper forwarding motor 19 in the acceleration mode, and carries out printing of the second data block by generating horizontally synchronized signals.

FIG. 46 is an explanatory diagram for showing the timing of pulses applied to the paper forwarding motor 19 and the film drive motor 47, in the operation shown in FIG. 45.

The first acceleration timings for block printing is the same as for FIG. 44. A deceleration, after a change to "L" level of the BUF1 signal, is carried out in M steps. The deceleration control for this is carried out also by changing the data set of the timer 199 shown in FIG. 22.

The deceleration for the paper forwarding motor 19 is carried out in steps of M which is the same number as for acceleration. Therefore, the BUF1 signal is controlled so as to be changed to "L" level by the line synchronization signal HSYNC0 which appears M steps prior to the temprorary halt. In this control, the printing unit line is set by the printing conditions at that time. Therefore, if the transfer to the next image buffer is completed at the point in time at which there is generated a borrow signal of a data transfer counter (which is counted down by the line synchronization signal HSYNC0) which is not shown and is provided in the printer transfer controller 159 of the printer interface 127, by the counting of the line synchronization signal HSYNC0, the BUF1 signal is set to "L" level. Therefore, the initial value of the counter that is set equals the value which is obtained by subtracting the value of step number M from the number of unit lines.

As described in the foregoing, according to the present embodiment, acceleration steps and deceleration steps are provided at the times of starting and stopping the paper transporting motor 19 and the film drive motor 47 that is driven in synchronization with the motor 19, as shown in FIG. 44 to FIG. 46. Accordingly, it is possible to control the operation of the motors 19 and 47 over the complete region of and speed-torque characteristics shown in FIG. 56, and therefore, it is possible to increase the speed of printing.

Moreover, according to the present embodiment, in bringing the printing operation to a temporary halt, the paper transporting motor 19 is brought to a stop after going through carefully planned deceleration steps therefore the recording paper 7 can be stopped precisely at the desired position without having step-out. As a result, a high quality printing can be realized without skips or splippages in the printing.

Furthermore, the continuous mode of printing and the intermittent mode of printing can be selected automatically so that it becomes possible to have a printing operation which corresponds to the sending speed of the printing data that is supplied from the host-side system 125.

Next, it should be noted that there exists another case of controlling the film drive motor 47. Namely, when a temporary halt is brought about by a STOP0 signal from the printer interface 127, the microprocessor starts to time count by using the timer 199. This time counting operation is carried out by counting the output of one channel of the timer 199 which is operating with a constant period (5 ms) with a counter register that is provided in the working RAM 205. When the counted time value coincides with the time out value T of the data table in the ROM 203, the microprocessor outputs driving pulses for one step portion to the film drive motor 47, and moves the film 1.

After clearing the counter register at that point in time, the microprocessor 171 again carries out the counting operation. This counting operation is brought to a stop when the STOP0 signal that indicates the start of the next printing data block is changed to "H".

Figure 47:
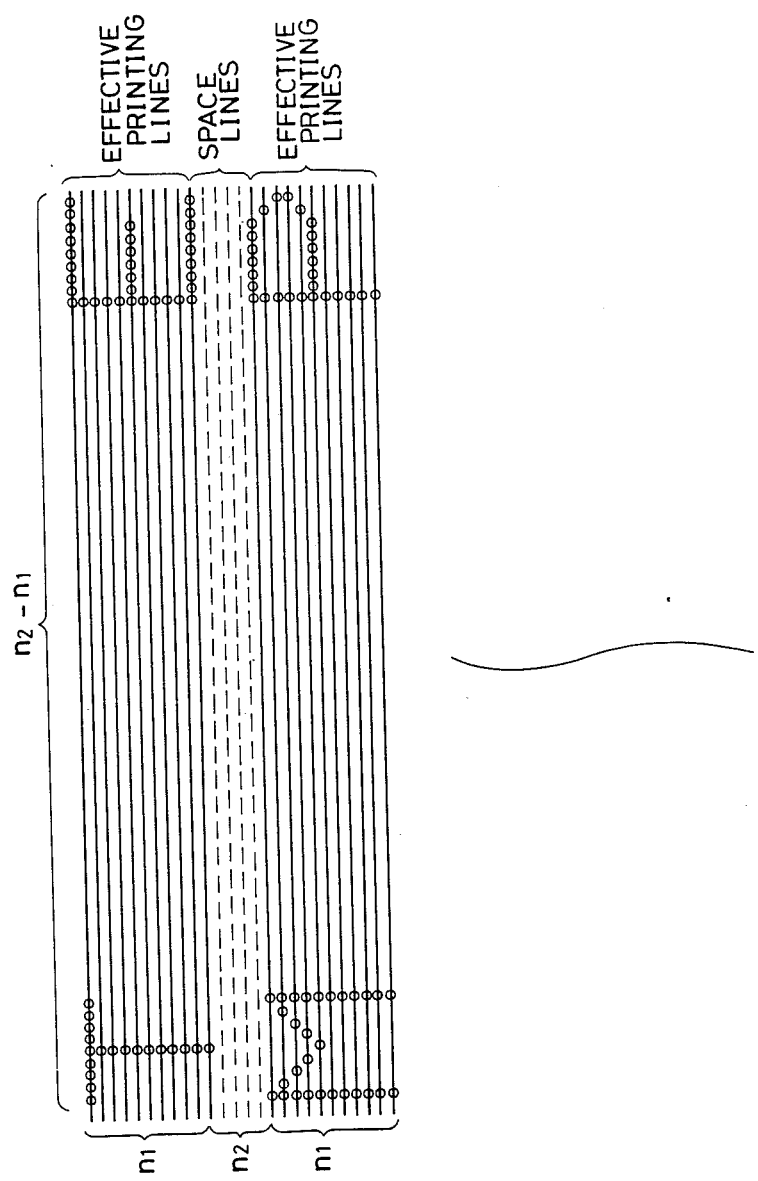
FIG. 47 shows the transverse effective printing range and the longitudinal effective printing range that correspond to respective FIGS. 20 and 21.

FIG. 47 shows the transverse effective printing range and the longitudinal effective printing range that correspond to FIG. 20 and FIG. 21, respectively.

The transverse effective range corresponds to n2 - n1 of FIG. 20 and the effective range of longitudinal unit line and the space correspond to n1 dots and n2 dots, respectively, of FIG. 21.

FIG. 48 shows the state which controls the ink temperature in the ink cartridge.

In the figure, $V_{TH1}$ and $V_{TH2}$ are voltage values at the connecting points between a thermistor 223 and a resistor R13 and a thermistor 225 and a resistor R14, respectively. Therefore, the voltages at these points change depending upon the temperatures detected by the thermistors. Namely, when the temperature is low, the thermistor resistance increases, hence raising the voltage. On the contrary, when the temperature increases, the voltage drop is reduced.

The microprocessor 171 reads the voltages $V_{TH1}$ and $V_{TH2}$ as digital information via the A/D converter 227, and compares them with the comparative data (here, the comparative data are the digitized values of $V_{TH1}$ and $V_{TH2}$ at a control temperature of 15° C.). If $V_{TH}$ has smaller value than the comparative data, the thermal insulation heater that corresponds to that thermistor is turned on. In the opposite case, the thermal insulation heater is turned off. By giving such a control it is possible to keep the ink temperature within a certain range.

Figure 49:
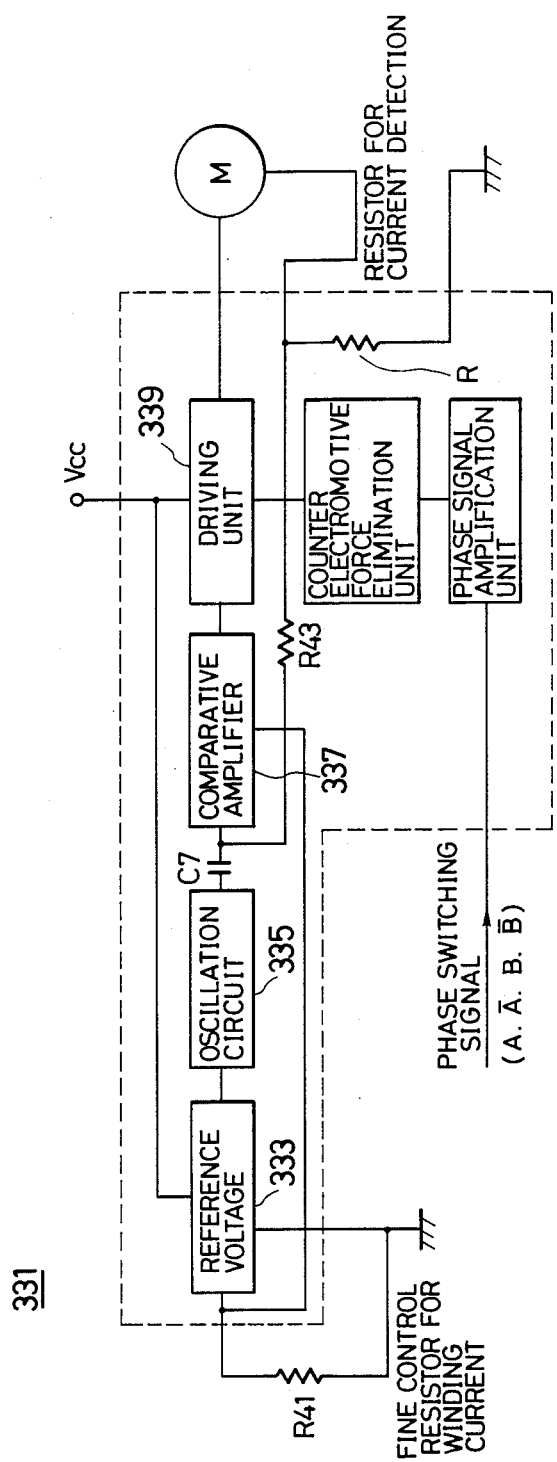
FIG. 49 is a block diagram which shows the configuration of the pulse motor driver IC.

FIG. 49 shows an internal block diagram of a pulse motor driver IC 331 which is used for the pulse motor driving circuit 177. This IC is a driver of constant current chopping type, for example SI-7115B made by Sanken Electric Co.

In FIG. 49, a reference voltage unit 333 is a circuit for generating a predetermined constant voltage from the supply voltage Vcc. A first output is connected to an oscillation circuit 335, and a second output which is generated by a division with an internal resistor of the first output is connected to an external resistor R41 and a comparative amplifier 337.

The oscillation circuit unit 335 is a circuit which creates a triangular wave for chopping control, and its output is given to the comparative amplifier 337 through a capacitor C7. The capacitor C7 is connected to a resistor R43 which is connected to a motor current detection resistor R. Accordingly, to the input on the capacitor C7 side of the comparative amplifier 337, there is supplied the resultant voltage of the output obtained by voltage transforming the motor current and the triangular wave from the oscillation circuit 335.

In the comparative amplifier 337, the second reference output from the reference voltage and the resultant voltage are compared, and only the portion to which is applied the resultant voltage which is smaller than the second reference output, is given to the driving unit 339 as a driving pulse signal. Accordingly, the pulse width of the driving pulse becomes stable at the point when a current flows in the motor, and the current aquires a value which corresponds to the second reference output voltage. In other words, the motor current is increased when the second reference output voltage becomes large, and is decreased when the output voltage becomes small.

Figure 50:
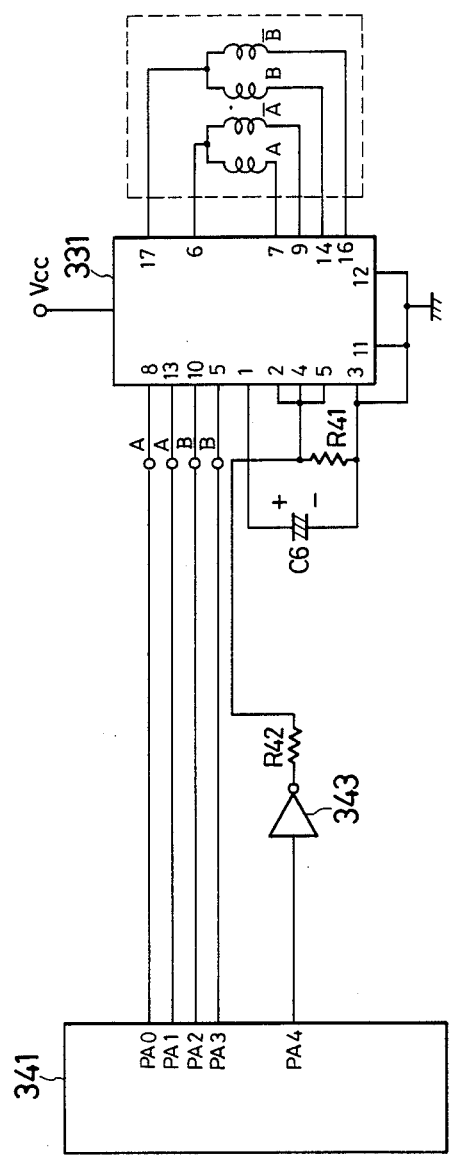
FIG. 50 is a block diagram which shows the circuit for film transportation that makes use of the pulse motor driver IC.

FIG. 50 shows details of the motor unit and the motor driving circuit 177, and the film driving unit of the output port shown in FIG. 49.

In FIG. 50, 341 is an I/O port for outputting a driving signal that drives the motor drive IC, PA0 to PA3 output driving signals for various phases of the pulse motor, and PA4 outputs a signal that controls the current in the winding of the motor drive IC 331.

To the fourth and the fifth pins of the reference voltage terminals of the comparative amplification circuit 337 in the motor drive IC 331, there are applied voltages that are divided by a resistor R41 and the resistors within the IC. To the fourth and fifth pins there is further connected a resistor R42 which is connected in turn to the output terminal of the open collector inverter 343. Because of this, when the output transistor of the inverter 343 is turned on, the resistor R41 and the resistor R42 become connected in parallel, so that the second reference voltage becomes low. Accordingly, the current flowing in the motor is different for the cases where the inverter 343 is turned on and off, and the current in the winding becomes large when the signal level of the output port PA4 is "L" and small when "H".

The winding current control signal of the output port PA4 becomes "L" level at the time of setting an initial value for the film, namely, when the film is rotated and transported at high speed, current flowing in the winding of the pulse motor is increased, so that a foot drive becomes possible. In addition, during printing, when the film is transported at a low speed, not much driving torque is required so that it becomes "H" level and the current is decreased.

As in the above, by controlling the current that flows in the winding, it is possible to operate the apparatus at high speed at its setting, and during printing it is possible to control noise, and especially vibrations, by reducing the driving current. By reducing vibration of the motor during printing, vibrations of the film can also be reduced, so that the resolving power of printing can be improved.

Figure 51:
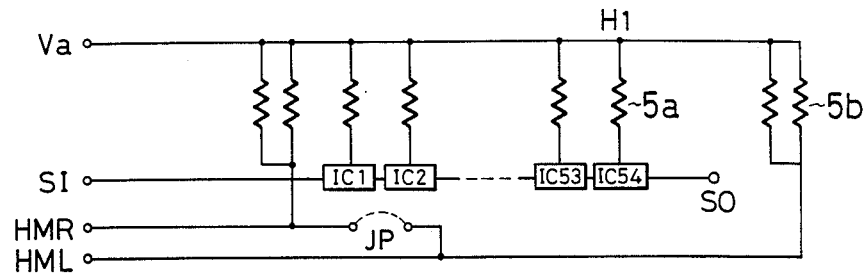
FIG. 51 and FIG. 52 are block diagrams which show other embodiments of the thermal head internal circuit shown in FIG. 12.

FIG. 51 shows another embodiment of the internal circuit of the thermal head shown in FIG. 12.

Figure 53:
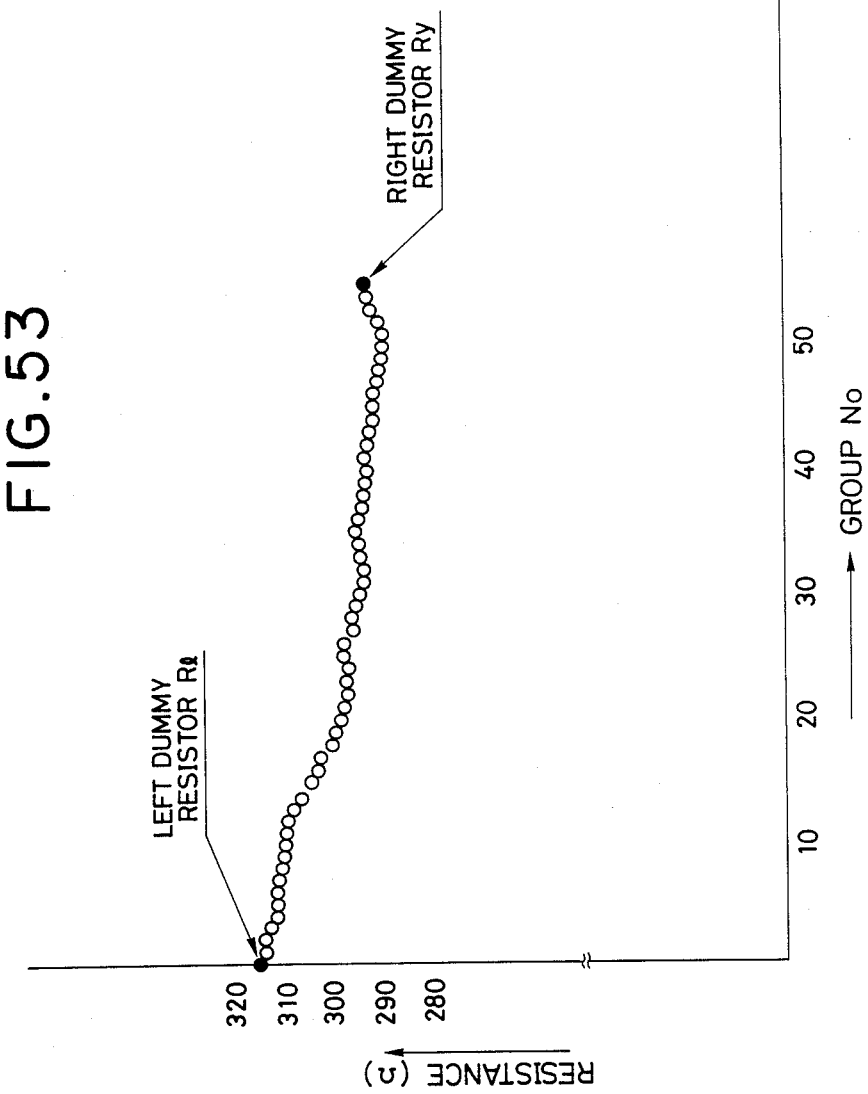
FIG. 53 is a diagram which shows the resistance distribution of the heating elements.

In this embodiment there are formed a second set up heating elements for control (referred to as the reactive heating elements hereinafter) 5c in addition to the reactive heating element 5b, on the head. The reactive heating elements 5b and 5c are provided on both sides of the effective heating elements 5a (H1 to H1728). The resistors of the reactive heating elements 5b and 5c are shown in FIG. 53 as right dummy resistor R4 and left dummy resistor R1. In addition, jumper line JP in FIG. 51 is a jumper line for connecting the reactive resistors 5b and 5c in parallel. The resultant resistance for the case of connecting with the jumper line JP is naturally proportional to the average resistance of the reactive resistors that are provided at left and right.

Accordingly, by connecting the HMR terminal of FIG. 51 to the analog input terminal of the A/D converter 264 of FIG. 30, a control of printing pulse width which is proportional to the parallel resistance of the reactive resistors can be achieved.

With such a control, heating elements are driven with pulse width conditions closer to the actual effective resistance, than in the case of controlling with resistance of a reactive resistor on one side only therefore, print dispersion in printing can be reduced and higher quality can be obtained.

Figure 52:
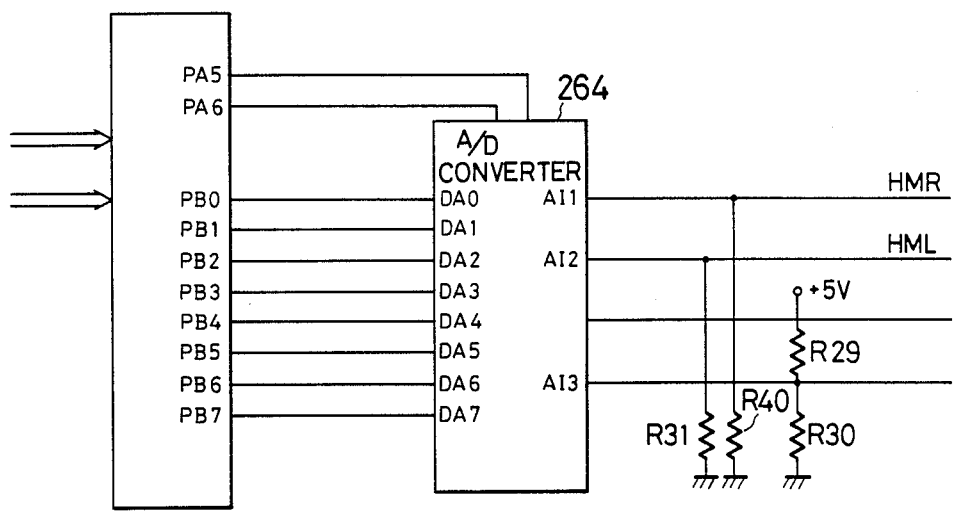

Next, an improvement on the control by the parallel reactive resistors will be described. In this case, the reactive heating elements 5b and 5c are input independently to the A/D converter 264. Namely, connection by a jumper line JP shown in FIG. 51 will not be given. The terminals HMR and HML are connected to the terminals AI1 and AI2 of the A/D converter in FIG. 52. The microprocessor 171 reads the reactive resistances R1 and R4 via the A/D converter 264 prior to the start of printing. The change in the resistance of the effective heating elements is calculated by connecting the resistances R1 and Rr of the reactive heating elements.

Figure 54:
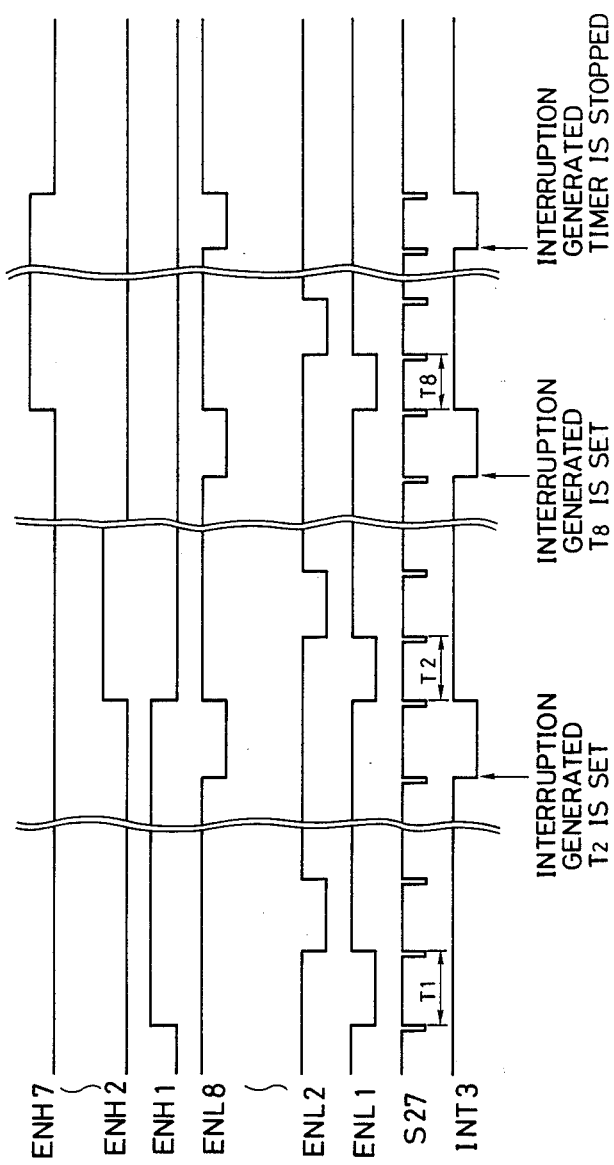
FIG. 54 is a time chart which shows the printing operation of the thermal head internal circuit in the embodiment shown in FIG. 52.

Actual control timing during printing is shown in FIG. 54. In the control shown in FIG. 54, the control for the effective heating elements 5a is carried out by setting the pulse width for each one of seven blocks that are segmented by the time division driving signals ENH1 to ENH7. Namely, an interruption is requested of the microprocessor 171 through the ENL 8 signal. An appropriate control on the width of the applied pulse is carried out by the microprocessor 171 by setting the values of the pulse width control table in the data ROM 203 to the timer 199 for each group unit, based on the result of calculation of the resistance. In the example shown in FIG. 54, the pulse width of T1 corresponds to the R1 side of FIG. 53 and T8 corresponds to the R4 side. Since R1>R4 holds, it is obtained that T1>T8.

By varying the applied pulse for each group as in the above, printings with higher quality can be obtained.

[Effects of the Invention]

As described in detail in the foregoing, a stable recording with the following features will become possible according to the present invention.

1. The printable area of a member to be recorded in the direction perpendicular to the direction of transportation is arranged to be set in response to the size of the member to be recorded, so that for a member to be recorded that has a width which is smaller than that of the film, heating elements beyond the width of the member to be recorded will not be energized, preventing spoiling the members surrounding the heating elements with ink. Therefore, it is possible to realize a stable printing without risk of spoiling a member to be recorded that is to be printed next.

2. Shifting of the film is arranged to be controlled synchronized with the transportation of the member to be recorded so that the control for film motion and the control for paper transportation can be accomplished using common control means. Therefore, it becomes possible to simplify the apparatus and reduce the price of the apparatus.

3. There is provided a buffer that has a capacity for a plurality of scanning lines corresponding to the printing dots of the heating elements, and recording is arranged to be controlled in a predetermined order with a buffer as the unit. Thus, for instance, by choosing the buffer capacity to be greater than the sum of the line member corresponding to the acceleration steps and the line number corresponding to the deceleration steps, of the pulse motor for transporting the member to be recorded, it becomes possible to control the pulse motor for transporting the member to be recorded, by providing acceleration steps and deceleration steps. Therefore, it is possible to operate the motor in a stable region of operation, and to improve the speed of printing. Moreover, the paper can be brought to a stop at a precise position without being out-of-step. Therefore, a stable recording that does not create skip or slippages of the prints can be realized.

What is claimed is:

1. A recording apparatus, comprising:
   printing means having a plurality of printing dots for printing data on a member to be recorded;
   a plurality of buffers, each operative to and having a capacity for storing a first predetermined amount of the printing data corresponding to a first plurality of scanning lines of the printing dots of said printing means, and operative to store a second predetermined amount of the printing data corresponding to a second plurality of scanning lines different than said first plurality of scanning lines; and
   recording control means governed by the amount of data stored in the plurality of buffers for controlling said printing means to print the printing data in accordance with a first operating characteristic at times when the first predetermined amount of printing data is stored in the plurality of buffers and in accordance with a second operating characteristic different from the first operating characteristic at times when the second predetermined amount of data is stored in the plurality of buffers.

2. The recording apparatus of claim 1, further comprising transporting means for transporting to successive scanning lines the member to be recorded at a rate of transportation that is either accelerated or decelerated, and wherein said first operating characteristic is the accelerated rate of transportation of the member, and the second operating characteristic is the decelerated rate of transportation of the member.

3. The recording apparatus of claim 2, wherein said recording control means controls the transportation means to decelerate transportation of the member to be recorded when the printing data stored in the plurality of buffers is less than said first predetermined amount.

4. The recording apparatus of claim 2, wherein said recording control means controls the transportation means to accelerate the member to be recorded when the printing data stored in the plurality of buffers is greater than said second predetermined amount.

5. A recording apparatus for recording printing data on a member to be recorded, by filing ink in a film having a plurality of minute orifices, comprising: means for spouting ink from the minute orifices by a pressure of bubbles generated through a heating of the ink with heating elements, comprising;
   a plurality of buffers each operative to and having a capacity for storing a first predetermined amount of the printing data corresponding to a first plurality of scanning lines, and further operative to store a second predetermined amount of the printing data corresponding to a second plurality of scanning lines;
   means for transporting the member to be recorded in accordance with an acceleration mode and a deceleration mode, the acceleration mode corresponding to a predetermined increasing rate of transportation and the deceleration mode corresponding to a predetermined decreasing rate of transportation; and
   recording control means governed by the first and second predetermined amount of data stored in the buffers for controlling the transporting means to transport the member to be recorded at a selected one of the acceleration and deceleration modes.

6. The recording apparatus of claim 5, wherein said recording control means controls the transportation means to operate in the deceleration mode to decelerate the member to be recorded at times when the amount of the printing data stored in the plurality of buffers is less than said first predetermined amount.

7. The recording apparatus of claim 5, wherein said recording control means controls the transportation means to operate in the acceleration mode to accelerate the member to be recorded at times when the amount of the printing data stored in the plurality of buffers is greater than said second predetermined amount.

* * * * *